(12) United States Patent
Patolsky et al.

(10) Patent No.: US 9,553,315 B2
(45) Date of Patent: *Jan. 24, 2017

(54) DIRECT LIQUID FUEL CELL HAVING AMMONIA BORANE OR DERIVATIVES THEREOF AS FUEL

(75) Inventors: Fernando Patolsky, Rechovot (IL); Boris Filanovsky, Jerusalem (IL); Eran Granot, Moshav Even Sapir (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 727 days.

This patent is subject to a terminal disclaimer.

(21) Appl. No.: 12/988,518

(22) PCT Filed: Nov. 12, 2009

(86) PCT No.: PCT/IL2009/001068
§ 371 (c)(1),
(2), (4) Date: Oct. 19, 2010

(87) PCT Pub. No.: WO2010/055512
PCT Pub. Date: May 20, 2010

(65) Prior Publication Data
US 2011/0039176 A1      Feb. 17, 2011

Related U.S. Application Data

(60) Provisional application No. 61/113,611, filed on Nov. 12, 2008, provisional application No. 61/230,764, filed on Aug. 3, 2009.

(51) Int. Cl.
*H01M 4/90* (2006.01)
*H01M 8/22* (2006.01)

(52) U.S. Cl.
CPC .............. *H01M 4/90* (2013.01); *H01M 4/9008* (2013.01); *H01M 8/222* (2013.01); *Y02E 60/50* (2013.01)

(58) Field of Classification Search
CPC ....... H01M 4/90; H01M 4/9008; H01M 8/222
(Continued)

(56) References Cited

U.S. PATENT DOCUMENTS

| 3,410,729 A | 11/1968 | Manion |
| 3,519,487 A | 7/1970 | Wolf et al. |

(Continued)

FOREIGN PATENT DOCUMENTS

| CN | 101339999 | 1/2009 |
| EP | 1843416 | 10/2007 |

(Continued)

OTHER PUBLICATIONS

International Search Report and the Written Opinion Dated Mar. 26, 2010 From the International Searching Authority Re.: Application No. PCT/IL2009/001067.

(Continued)

*Primary Examiner* — Ula C Ruddock
*Assistant Examiner* — Frank Chernow

(57) ABSTRACT

Fuel cell systems comprising ammonia borane or derivatives thereof as fuel and an anode and/or cathode which comprises a non-noble metal (e.g., copper) or a non-metallic substance (e.g., an iron electron-transfer mediating complex) as a catalyst are disclosed. Fuel cell systems comprising ammonia borane or derivatives thereof as fuel and a peroxide as an oxidant are also disclosed. Uses of the fuel devices are further disclosed.

37 Claims, 14 Drawing Sheets

(58) Field of Classification Search
USPC .......................................................... 429/504
See application file for complete search history.

(56) References Cited

U.S. PATENT DOCUMENTS

| | | | |
|---|---|---|---|
| 4,001,040 | A | 1/1977 | Fukuda et al. |
| 7,285,142 | B1 | 10/2007 | Mohajeri et al. |
| 7,320,842 | B2 | 1/2008 | Ozaki et al. |
| 7,544,837 | B2 | 6/2009 | Blacquiere et al. |
| 2003/0175580 | A1 | 9/2003 | Ozaki et al. |
| 2005/0106430 | A1 | 5/2005 | Yamada et al. |
| 2005/0266281 | A1* | 12/2005 | Adams et al. ................ 429/17 |
| 2007/0128475 | A1 | 6/2007 | Blacquiere et al. |
| 2007/0151153 | A1 | 7/2007 | Xu et al. |
| 2007/0227300 | A1* | 10/2007 | McGrath et al. ............... 75/255 |
| 2008/0124600 | A1* | 5/2008 | Shimoyamada et al. ....... 429/30 |
| 2011/0053022 | A1* | 3/2011 | Patolsky et al. ............. 429/428 |

FOREIGN PATENT DOCUMENTS

| | | | |
|---|---|---|---|
| GB | 1014232 | 12/1965 | |
| GB | 1165851 | 10/1969 | |
| JP | 2008-293762 | 12/2008 | |
| WO | WO 2006/061992 | 6/2006 | |
| WO | WO 2006063992 A2 * | 6/2006 | .............. B01J 23/40 |
| WO | WO 2010/055512 | 5/2010 | |

OTHER PUBLICATIONS

International Search Report and the Written Opinion Dated Mar. 31, 2010 From the International Searching Authority Re.: Application No. PCT/IL2009/001068.

Demirci et al. "Sodium Borohydride Versus Ammonia Borane, in Hydrogen Storage and Direct Fuel Cell Applications", Energy & Environmental Science, 2: 627-637, 2009.

Logan et al. "Microbial Challenges and Fuel Cells-Applications. Harnessing the Metabolic Activity of Bacteria Can Provide Energy for a Variety of Applications, Once Technical and Cost Obstacles Are Overcome", Environmental Science & Technology, p. 5172-5180, Sep. 1, 2006.

Xu et al. "Catalytic Activities of Non-Noble Metals for Hydrogen Generation From Aqueous Ammonia-Borane at Room Temperature", Journal of Power Sources, XP002573446, 163: 364-370, Oct. 27, 2006. Abstract, p. 365, 369, Table 1.

Corey et al. "Chemistry of Diimide. II. Stereochemistry of Hydrogen Transfer to Carbon-Carbon Multiple Bonds", Journal of the American Chemical Society, JACS, 83(13): 2957-2958, Jul. 5, 1961.

Jiang et al. "Catalytic Effect of Nanogold on Cu(II)-N2H4 Reaction and Its Application to Resonance Scattering Immunoassay", Analytical Chemistry, 80(22): 8681-8687, Nov. 15, 2008.

Karim-Nezhad et al. "Copper (Hydr)Oxide Modified Copper Electrode for Electrocatalytic Oxidation of Hydrazine in Alkaline Media", Electrochimica Acta, 54: 5721-5726, 2009.

Lin et al. "Cupric Ion Catalyzed Diimide Production From the Reaction Between Hydrazine and Hydrogen Peroxide", Applied Catalysis A: General, 263: 27-32, 2004.

Yamada et al. "Potential Application of Anion-Exchange Membrane for Hydrazine Fuel Cell Electrolyte", Electrochemistry Communications, 5: 892-896, 2003.

Zhang et al. "A High Performance Anion Exchange Membrane-Type Ammonia Borane Fuel Cell", Journal of Power Sources, 182: 515-519, 2008.

Zhang et al. "A New Fuel Cell Using Aqueous Ammonia-Borane as the Fuel", Journal of Power Sources, 168: 167-171, 2007.

Preliminary Report on Patentability Dated May 26, 2011 From the International Bureau of Wipo Re. Application No. PCT/IL2009/001067.

Preliminary Report on Patentability Dated May 26, 2011 From the International Bureau of WIPO Re. Application No. PCT/IL2009/001068.

Jiang et al. "Catalytic Effect of Nanogold on Cu(II)-N2H4 Reaction and Its Application to Resonance Scattering Immunoassay", Analytical Chemistry, 80(22): 8681-8687, Nov. 15, 2008.

Official Action Dated Feb. 14, 2012 From the US Patent and Trademark Office Re. U.S. Appl. No. 12/988,517.

Official Action Dated Sep. 19, 2012 From the US Patent and Trademark Office Re. U.S. Appl. No. 12/988,517.

Communication Pursuant to Article 94(3) EPC Dated Apr. 18, 2013 From the European Patent Office Re. Application No. 09771417.4.

* cited by examiner

DIRECT LIQUID FUEL CELL HAVING AMMONIA BORANE OR DERIVATIVES THEREOF AS FUEL

RELATED APPLICATIONS

This Application is a National Phase of PCT Patent Application No. PCT/IL2009/001068 having International filing date of Nov. 12, 2009, which claims the benefit of U.S. Provisional Patent Application No. 61/230,764 filed on Aug. 3, 2009, and 61/113,611, filed on Nov. 12, 2008. The contents of the above Applications are all incorporated herein by reference.

FIELD AND BACKGROUND OF THE INVENTION

The present invention, in some embodiments thereof, relates to energy conversion and, more particularly, but not exclusively, to a direct liquid fuel cell system, which utilizes ammonia borane or derivatives thereof as fuel, and to applications employing a fuel cell system.

A fuel cell (FC) is an electrochemical device that continuously converts chemical energy directly to electrical energy as long as a fuel (commonly hydrogen, or hydrogen-containing compounds) and an oxidant (commonly oxygen) are supplied. One of the main advantages of fuel cells is their high energy density (typically 8,000-9,000 Wh/kg), which is about 18 times higher than conventional electrochemical power sources (such as, for example, Pb—PbO$_2$; Zn—O$_2$; Zn—Ag; Ni—Cd; Li-ion etc.).

Fuel cells are characterized by high efficiency compared to internal combustion engines. In addition, fuel cells are ecologically friendly and several types can function at temperatures as high as 100° C.

The development of fuel cells is one of the main directions in the field of new power engineering. Several types of fuel cells based on H$_2$/O$_2$, phosphoric acid, molten carbonate, alkaline, proton exchange membrane, direct methanol and solid oxide were developed in the last two decades [Carrette et al., *Chem Phys Chem.* 2000, 1, 162; Springer et al., *J. Electrochem Soc.* 1991, 8, 2334; Atkinson et al., *Nature,* 2004, 3, 17; Steele and Heinzel, *Nature,* 2001, 14, 345]. However, these fuel cells are still far from mass production due to multiple practical limitations.

Some of the obstacles associated with fuel cell development include complex electrode and cell design, catalysts poisoning and mechanical instability, high catalyst cost, low potential and slow oxidation kinetic.

In the last years, research efforts were focused on hydrogen-rich boron compound derivative-based fuel cells such as sodium borohydride fuel cells [see, for example, Miley et al. *J. Pow Sour.* 2007, 165, 509; Amendola et al. *J. Pow Sour.* 1999, 84, 130; Leon et al. *J. Pow Sour.* 2006, 155, 172; U.S. Pat. Nos. 6,562,497, 6,758,871 and 6,630,226; Leon et al. *J. Pow Sour.* 2007, 164, 441; Raman and Shukla, *Fuel cell,* 2007, 3, 225; Wee, J. H. *J. Pow. Sour.* 2006, 155, 329; Li et al. *J. Electrochem. Soc.* 2003, 150, A868; Liu et al. *J. Pow. Sour.* 2008, 175, 226; Kim et al. *J. Electrochem. Soc.* 2004, 151, A1039; and Choudhury et al. *J. Pow. Sour.* 2005, 143, 1].

Sodium borohydride is stable in solid state, and is characterized by an electrical capacity of 5,670 Ah/kg, energy density of 9,300 Wh/kg and hydrogen content of 11% (w/w). Sodium borohydride has no kinetic limitations, especially when utilized in the presence of noble metal catalysts. The standard potential of reduction (E$_0$) of sodium borohydride (BH$_4^-$) is −1.24 V (see, equation 1 below).

$$BH_4^- + 8OH^- \rightarrow BO_2^- + 6H_2O + 8e^-\ E° = -1.24\ V \quad (1)$$

One of the first NaBH$_4$-based fuel cells, developed by Amendola et al. (supra), consists of BH$_4^-$ solution as fuel (in 6M NaOH), O$_2$ as oxidant, OH$^-$ ion as conducting membrane and Au/Pt anode and cathode as catalysts. This fuel cell functions only at 70° C., and shows high specific power density of 60 mW/cm$^2$ (I=120 mA/cm$^2$). This type of fuel cells, however, suffers from several drawbacks: the use of noble metal catalysts for increasing the cell efficiency is both costly and impractical, because BH$_4^-$ is not chemically stable in the presence of such catalysts (due to hydrogen gas evolution), especially at the cell's working temperature (70° C.); the cathode/anode poisoning as a result from the existence of CO in air (carbonization), which requires a special scrubbing device to remove CO from air inlet; the inherent instability of BH$_4^-$ anion in alkali solutions other than concentrated alkali solutions (>6M NaOH), with the latter being user unfriendly; and the slow kinetic of oxygen reduction.

Sodium borohydride-based fuel cells which utilize hydrogen peroxide as oxidant have therefore been developed (see, for example, Walsh et al, supra). These fuel cells have all the above-described inherent disadvantages of BH$_4^-$/noble metal catalysts, and, moreover, a concentrated alkali solution (6M NaOH) in the anode compartment and a concentrated acidic solution (2M HCl) in the cathode compartment are used.

NaBH$_4$\H$_2$O$_2$ fuel cells which use metal catalysts (for anode and cathode) and Nafion-961 membrane, have also been developed (see, Shukla et al, supra). These fuel cells are characterized by modest current density and are further disadvantageous for using concentrated acidic and basic solutions.

Ammonia-borane (AB, NH$_3$BH$_3$) has recently been suggested as an alternative hydrogen-rich boron material. Ammonia borane (or borazane) is characterized by an electrical capacity of 5200 Ah/kg, energy density of 8400 Wh/kg (as NaBH$_4$) and hydrogen content of 19% (w/w). AB is stable in aqueous solutions at pH≥6.5, in contrast to BH$_4^-$. The standard potential of reduction (E$_0$) of Ammonia-borane is −1.216 V (see, equation 2 below).

$$NH_3BH_3 + 6OH^- \rightarrow BO_2^- + NH_4^+ + 4H_2O + 6e^-\ E° = -1.216\ V \quad (2)$$

Yao et al. [Journal of Power Sources 2007, 165, 125; referred to herein throughout as Zhung] described a fuel cell consisting of 0.5M AB (2M NaOH)—Ag catalyst//air/MnO$_2$ catalyst. The cell produces an open circuit potential (E$_{OCP}$) of −1.15 V, a current of 1 mA/cm$^2$ for E$_W$=0.9 V, a current of 2 mA/cm$^2$ for E$_W$=0.8 V and a current of 10 mA/cm$^2$ for E$_W$=0.4 V.

Zhang et al. [*J. Pow. Sour.* 2007, 168, 167; referred to herein throughout as Xu-1] describe a fuel cell consisting of AB (2M NaOH)-air fuel cell using Pt catalyst (0.15 mg/cm$^2$ for anode and cathode). In this fuel cell, thiourea (1 mM) was added to the background electrolyte in order to prevent fuel spontaneous hydrolysis (decomposition). The cell produces a current of 24 mA/cm$^2$ (E$_W$=0.8 V) at RT. Zhang et al. [*J. Pow. Sour.* 2008, 182, 515; referred to hereinthroughout as Xu-2] further described fuel cell that consists of anode −0.5M AB (2M NaOH)/Pt-0.9 mg/cm$^2$//cathode Pt-1.3 mg/cm$^2$, humidified O$_2$. Pump was used for fuel supply and fan was used for air (O$_2$) supply. The cell produces a current of 50 mA/cm$^2$ at E$_W$=0.75 V (E$_{OCP}$=−1.08 V).

U.S. Patent Application having Publication No. 2007/0151153, by Xu et al. describes a method of hydrogen generation which is effected by contacting ammonia borane with a metal catalyst, a solid acid or carbon dioxide, and further teaches using the generated hydrogen as fuel for fuel cells. JP Patent Application No. 2006-286549 teaches a direct liquid type fuel cell that utilizes an aqueous solution of a borane ammonium compound.

Additional background art includes U.S. Pat. No. 7,544,837 and U.S. Patent Application having Publication No. 2007/0128475, which teach a method of dehydrogenating an amine-borane using a base metal catalyst. The method, according to the teachings of these documents, may be used to generate $H_2$ for portable power sources, such as fuel cells; and U.S. Pat. No. 7,285,142, which teaches a hydrolytic in-situ hydrogen generator that contains an amine borane (AB) complex in a solid or a slush form, at least one hydrogen generation catalyst, being an inorganic metal complex of the platinum group of metals, and water or other hydroxyl group containing solvent.

Further background art includes a review by Demirchi and Miele [*Energy & Environmental Sci*, 2009, DOI 10.1039/b900595a)], in which sodium borohydride-based fuel cells vs. ammonia borane-based fuel cells are discussed.

Hydrogen peroxide ($H_2O_2$) is characterized by high standard potential of reduction ($E_0$) of 1.77 V, and is therefore considered as a potent oxidant.

An $AB/H_2O_2$ fuel cell is characterized by a theoretical energy of 15,500 W/kg while a $SB/O_2$ fuel cell is characterized by a theoretical energy of only 9,400 W/kg [see, for example, Demirchi's review, supra].

In the last years, non noble cathodes such as $MnO_2$ were used as catalysts for the electro-oxidation of hydrogen peroxide, but were found ineffective [see, for example, as review by Walsh at al., J. power sources, 155 (2006) 172].

Lead sulfate ($PbSO_4$) was also used as hydrogen peroxide ($H_2O_2$) catalyst [A. Shukla, Fuel cell 07; (2007) No. 3; 225-231].

Many electrochemical $H_2O_2$ sensors were fabricated, based on different electron mediators such as Prussian blue [Arkady et al. Anal. Chem., 1995, 67 (14), pp 2419-2423], ferrocene (FeC) [Mulchandani et al., Anal. Chem. 1995, 67, 94-100] and others [see, for example, A. Shinishiro; Chem. Sens, v.21 sup.B (2005) 61], however, the methodologies utilizing such catalysts produced a relatively low current.

Shukla et al. described the use of Prussian blue (PB) as an inorganic electron-transfer mediator (on carbon black; C/PB and polymer) as a catalyst for $H_2O_2$ reduction in a $SB/H_2O_2$ fuel cell [Shukla at al., J. Power sources, 2008, 178, 86]. The taught C/PB electrode was associated with a complicated fabrication protocol and a modest current density of about 35 mA/cm².

Ferrocene is known as a potent electron-transfer mediator [see, for example, Anthony et al., Anal. Chem., 1984, 56, 667-671; Gagne et al., Inorg. Chem. 1980, 19, 2854-2855]. Ferrocene is chemically stable in acid solutions and is characterized by good absorption to carbon materials (via π-π interaction).

Attempts to adapt C/Fc for fuel cell technology have been described [see, for example, U.S. Pat. No. 7,320,842; and K. Gong, Science, 2009, 223, 760]. The described methodologies, however, involved a treatment at a temperature of 700° C., which results in decomposition of the C/Fc catalyst.

Additional art includes Logan B. E. and Regan J. M., Environmental Science & Technology, Sep. 1, 2006, 5172-5180.

SUMMARY OF THE INVENTION

The present invention, in some embodiments thereof, relates to a novel liquid fuel cell and, more particularly, but not exclusively, to a direct liquid fuel cell (DLFC), which is based on ammonia borane and/or derivatives thereof as fuel and which can operate in the presence of non-noble metal catalysts in one of both of the anode and cathode in the cell, and which alternatively, or in addition, utilizes a peroxide as an oxidant.

The present inventors have surprisingly uncovered that ammonia borane-based fuel cells can operate more efficiently when the commonly used Pt-containing electrodes are replaced by Au—, Ag— and/or Cu-containing electrodes. More surprisingly, it was uncovered that the use of Cu-containing electrodes results in a fuel cell which exhibits the most improved performance.

The present inventors have further surprisingly uncovered that ammonia borane-based fuel cells can efficiently operate when a non-metallic catalyst, such as an organic or inorganic metal complex supported on a carbon electrode, is used in the cathode compartment.

The present inventors have designed and successfully prepared and practiced a direct liquid fuel cell which uses hydrogen peroxide as oxidant, an aqueous solution of ammonia-borane as fuel; an anode that comprises Cu as a catalyst layer for anodic electro-oxidation; and a cathode that comprises a metal complex as a catalyst layer for cathodic electro-reduction. Using such a fuel cell system, ammonia-borane is oxidized and produces electric current, together with hydrogen formation/evolution as a side product, which can be later utilized in a hybrid engine. The use of ammonia-borane and a copper-containing catalyst allows the improvement of the fuel cell efficiency.

According to an aspect of embodiments of the invention, there is provided a fuel cell system comprising an anode compartment, a cathode compartment and a separator interposed between the cathode and the anode compartments, the anode compartment comprising a $R_1R_2R_3N—BR_4R_5R_6$ as fuel and an anode having a catalyst layer that comprises copper, and the cathode compartment comprising a cathode having a catalyst layer that comprises a non-metallic substance, wherein each of $R_1$-$R_6$ is independently selected from the group consisting of hydrogen, alkyl, alkenyl, alkynyl, haloalkyl, cycloalkyl, heteroalicyclic, alkoxy, thioalkoxy, and amine, provided that at least one of $R_4$, $R_5$ and $R_6$ is hydrogen.

According to an aspect of some embodiments of the invention there is provided a fuel cell system comprising an anode compartment, a cathode compartment and a separator interposed between the cathode and the anode compartments, the anode compartment comprising a $R_1R_2R_3N—BR_4R_5R_6$, as defined herein, as fuel, and at least one of the anode and the cathode comprising a catalyst layer that comprises a non-noble metal and/or a non-metallic substance.

According to another aspect of some embodiments of the invention there is provided a fuel cell system comprising an anode compartment, a cathode compartment and a separator interposed between the cathode and the anode compartments, the anode compartment comprising a $R_1R_2R_3N—BR_4R_5R_6$, as defined herein, as fuel, and at least one of the anode and the cathode comprising a catalyst layer that comprises at least one of copper, silver, gold and an alloy of at least one of copper, silver and gold.

According to some embodiments of the invention, the anode comprises a catalyst layer that comprises copper.

According to yet another aspect of some embodiments of the invention there is provided a fuel cell system comprising an anode compartment, a cathode compartment and a separator interposed between the cathode and the anode compartments, the anode compartment comprising a $R_1R_2R_3N$—$BR_4R_5R_6$, as defined herein, as fuel, and the cathode compartment comprising a cathode having a catalyst layer that comprises a non-metallic substance.

According to some embodiments of the invention, the anode comprises a catalyst layer that comprises at least one of copper, silver, gold and an alloy of at least one of copper, silver and gold.

According to some embodiments of the invention, the anode comprises a catalyst layer that comprises copper.

According to some embodiments of the invention, the anode comprises a catalyst layer that comprises a non-noble metal.

According to still another aspect of some embodiments of the invention there is provided a fuel cell system comprising an anode compartment, a cathode compartment and a separator interposed between the cathode and the anode compartments, the anode compartment comprising a $R_1R_2R_3N$—$BR_4R_5R_6$, as defined herein, as fuel, and the cathode compartment comprising a peroxide oxidant.

According to some embodiments of the invention, at least one of the anode and the cathode comprises a catalyst layer that comprises a non-noble metal.

According to some embodiments of the invention, the anode comprises a catalyst layer that comprises a non-noble metal.

According to some embodiments of the invention, the non-noble metal is copper.

According to some embodiments of the invention, the anode comprises a catalyst layer that comprises at least one of copper, gold, silver and an alloy thereof.

According to some embodiments of the invention, the cathode comprises a catalyst layer that comprises a non-metallic substance.

According to another aspect of some embodiments of the invention there is provided a fuel cell system comprising an anode compartment, a cathode compartment and a separator interposed between the cathode and the anode compartments, the anode compartment comprising a $R_1R_2R_3N$—$BR_4R_5R_6$, as defined herein, as fuel, and at least one of the anode and the cathode comprising a catalyst layer which comprises a non-noble metal and/or a non-metallic substance.

According to some embodiments of the invention, each of the anode and the cathode comprises a catalyst layer which comprises a non-noble metal and/or a non-metallic substance.

According to some embodiments of the invention, the anode comprises a catalyst layer which comprises a non-noble metal.

According to some embodiments of the invention, the non-noble metal is copper.

According to some embodiments of the invention, the cathode comprises a catalyst layer which comprises a non-metallic substance.

According to some embodiments of the invention, whenever not specifically indicated, the cathode compartment can comprise any suitable oxidant, which is reduced during the fuel cell electrochemical reaction. According to some embodiments of the invention, the cathode compartment comprises a peroxide oxidant.

According to some embodiments of the invention, the peroxide oxidant is hydrogen peroxide.

According to some embodiments of the invention, in any of the fuel cells described herein, at least one of the anode and the cathode is devoid of platinum (Pt) or a Pt group metal (PGM).

According to some embodiments of the invention, both the cathode and the anode are devoid of Pt or a Pt group metal (PGM).

Whenever the fuel cell comprises an anode comprising a catalyst layer which comprises copper, gold, silver or an alloy thereof, the catalyst layer of the cathode can be any suitable catalyst layer.

According to some embodiments of the invention, the cathode comprises a catalyst layer that comprises a substance selected from the group consisting of a non-metallic substance, gold, silver, copper, an alloy of at least one of gold, silver and copper, Pt or a Pt group metal, $MnO_2$, and/or other oxides of transition metals.

According to some embodiments of the invention, the cathode comprises a catalyst layer that comprises anonmetallic substance.

According to some embodiments of the invention, the non-metallic substance utilized in any of the aspects and/or embodiments of the invention is selected from the group consisting of a metal complex (including organometallic complexes and inorganic complexes) and an organic substance.

According to some embodiments of the invention, the non-metallic substance is an electron-transfer mediating substance.

According to some embodiments of the invention, the non-metallic substance is ferrocene.

According to some embodiments of the invention, whenever copper is utilized as a catalyst layer, the copper comprises copper nanoparticles.

Similarly, according to some embodiments of the invention, each of the copper, silver, gold and the alloy thereof is in a form of nanoparticles.

According to some embodiments of the invention, the nanoparticles are in a form selected from the group consisting of nanorods, nanowires and round-shaped nanoparticles.

According to some embodiments of the invention, a size of the nanoparticles ranges from 10 nm to 500 nm.

According to some embodiments of the invention, each of the copper, the silver and/or the gold, when utilized as a catalyst layer, has a purity greater than 99%.

According to some embodiments of the invention, the anode compartment further comprises an alkaline aqueous solution.

According to some embodiments of the invention, the alkaline aqueous solution comprises a metal alkali hydroxide.

According to some embodiments of the invention, the metal alkali hydroxide is selected from the group consisting of sodium hydroxide, potassium hydroxide, lithium hydroxide, magnesium hydroxide, calcium hydroxide, strontium hydroxide and barium hydroxide. According to some embodiments of the invention, the metal alkali hydroxide is sodium hydroxide.

According to some embodiments of the invention, a concentration of the metal alkali hydroxide ranges from 0.5M to 6M.

According to some embodiments of the invention, a concentration of the metal alkali hydroxide ranges from 0.6M to 2M.

According to some embodiments of the invention, a concentration of the fuel in the aqueous solution ranges from 0.01M to saturation. According to some embodiments of the invention, a concentration of the fuel in the aqueous solution ranges from 0.01M to 3M. According to some embodiments of the invention, the cathode compartment further comprises an acidic aqueous solution.

According to some embodiments of the invention, the aqueous solution comprises an acid at a concentration that ranges from 0.5M to 5M.

According to some embodiments of the invention, the acid is selected from the group consisting of HCl, $H_2SO_4$ and a mixture thereof.

According to some embodiments of the invention, whenever the cathode compartment comprises a peroxide oxidant, a concentration of the peroxide oxidant ranges from 0.5% w/w to 25% w/w.

According to some embodiments of the invention, the anode and/or the cathode comprises a chemically modified electrode.

According to some embodiments of the invention, the separator comprises a solid electrolyte membrane.

According to some embodiments of the invention, the solid electrolyte membrane is selected from the group consisting of a Nafion membrane, a polypropylene membrane and a combination thereof.

According to some embodiments of the invention, any of the fuel cell systems presented herein exhibits an open circuit potential ($E_{OCP}$) higher than 2 volts.

According to some embodiments of the invention, any of the fuel cell systems presented herein exhibits a power output (W) that equals to or in greater higher than 1 Watt.

According to an additional aspect of some embodiments of the invention, there is provided a fuel cell system comprising an anode compartment, a cathode compartment and a separator interposed between the cathode and the anode compartments, the anode compartment comprising a fuel and a non-noble catalyst layer each selected such that at least a substantial portion of the catalyst layer remains unoxidized when the fuel cell is operated. According to some embodiments of the invention, the fuel is $R_1R_2R_3N\text{---}BR_4R_5R_6$, as defined herein.

According to yet an additional aspect of some embodiments of the invention, there is provided a fuel cell system comprising an anode compartment, a cathode compartment and a separator interposed between the cathode and the anode compartments, at least one the anode and the cathode comprising a catalyst layer which comprises copper nanoparticles.

According to a further aspect of some embodiments of the invention there is provided a process of producing an electrode having a catalyst layer that comprises copper nanoparticles, the process comprising:

contacting an electrode having a catalyst layer that comprises copper with a solution containing a copper salt and base, to thereby obtain a layer of the copper salt applied onto the electrode; and contacting the electrode having the layer of copper salt applied thereon with phosphinic acid or a salt thereof, thereby producing the electrode.

According to a further aspect of some embodiments of the invention there is provided a method of operating a fuel cell, the method comprising contacting an anode compartment of the fuel cell with an anode electrolyte solution that comprises an ammonia borane-based fuel, as described herein, and, at the same time, contacting a cathode compartment of the fuel cell with a cathode electrolyte solution which comprises an oxidant, as described herein, and electrochemically reacting the fuel and the oxidant, wherein at least one of the anode and the cathode comprises a catalyst layer that comprises a non-noble metal and/or a non-metallic substance, the fuel cell further comprising a separator interposed between the anode compartment and the cathode compartment.

According to a further aspect of some embodiments of the invention there is provided a method of producing an electrical energy, the method comprising electrochemically reacting an ammonia borane-based fuel, as described herein, wherein the fuel is contacted with an anode compartment, and the oxidant is contacted with a cathode compartment, the anode compartment and the cathode compartment are assembled as a fuel cell which further comprises a separator interposed between the anode compartment and the cathode compartment, wherein at least one of the anode and the cathode comprising a catalyst layer that comprises a non-noble metal and/or a non-metallic substance.

According to a further aspect of some embodiments of the invention there is provided a power plant comprising any of the fuel cell systems presented herein.

According to a further aspect of some embodiments of the invention there is provided a fuel cell vehicle, comprising any of the fuel cell systems presented herein.

According to a further aspect of some embodiments of the invention there is provided a portable power source, comprising any of the fuel cell systems presented herein.

According to some embodiments of the invention, the portable power source is being adapted to power an appliance selected from the group consisting of a notebook computer, a portable charging dock, a cellular phone, a pager, a PDA, a digital camera, a smoke detector, a hearing aid, a portable TV, night vision goggles, a portable GPS device, a portable lighting device, a toy, a computer peripheral device, an emergency light, generator and the like, a cordless vacuum cleaner, a cordless drill and a cordless saw.

According to a further aspect of some embodiments of the invention there is provided a method of powering an electricity-consuming device, the method comprising powering the device by any of the fuel cell systems as described herein.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods and examples are illustrative only and are not intended to be necessarily limiting.

BRIEF DESCRIPTION OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 2(A-D) present comparative plots showing the electro-oxidation process of ammonia-borane as obtained in experiments performed according to various exemplary embodiments of the present invention.

FIG. 6A presents the oxidation current responses of sodium borohydride, at a concentration of 0.4M, in the presence of Cu (a), E-tech (b), Au (c) and Ru (d), as a catalyst. FIG. 6B presents the oxidation current responses of ammonia-borane, at a concentration of 0.4M, in the presence of Ru (a), E-tech (b), Au (c), and Cu (d), as a catalyst. FIG. 6C shows the potential applied vs. time for all experiments.

DESCRIPTION OF SPECIFIC EMBODIMENTS OF THE INVENTION

Figure 1A:
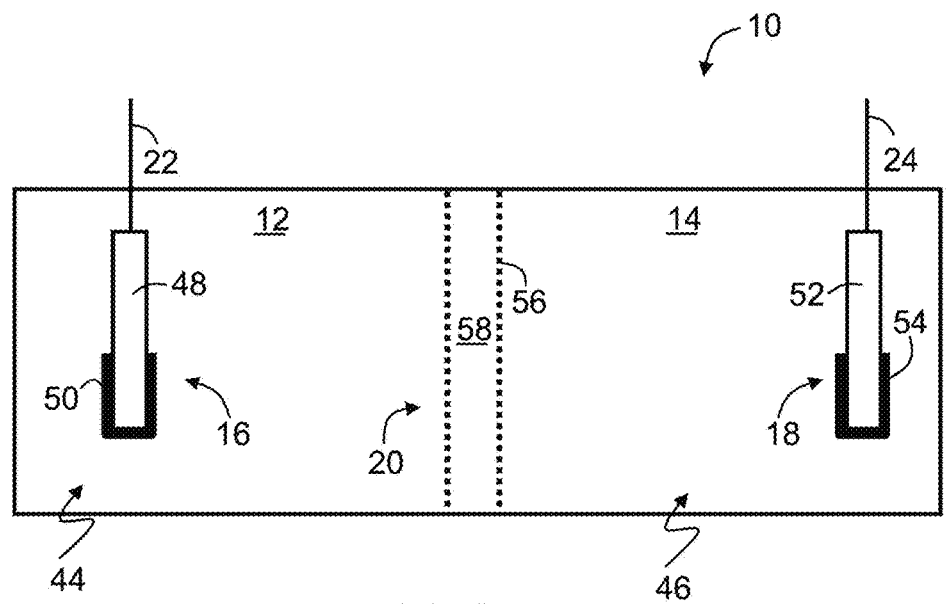
FIGS. 1A and 1B are schematic illustrations of a fuel cell, according to various exemplary embodiments of the present invention.

The present invention, in some embodiments thereof, relates to energy conversion and, more particularly, but not exclusively, to a direct liquid fuel cell system, which utilizes ammonia borane or derivatives thereof as fuel, and to applications employing a fuel cell system.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Walsh, Shukla and Miley (supra) suggested borohydride fuel cells in which $E_{OCP}$ (and $E_W$) is increased using concentrated alkali solution in the cathode compartment and concentrated acid solutions in the anode compartment. Using Nernst equations (for Pt electrode): $\Delta E_N \approx 840$ mV in case of 6M NaOH in anode compartment and 1M $H_2SO_4$ used in cathode compartment. The $E_{OCP}$ depends on the AB concentration (anode compartment) and is defined as $E_{OCP}=E_{OCP-A}+\Delta E_N$. By using 6M NaOH in anode compartment and 1M $H_2SO_4$ used in cathode compartment the $E_{OCP}$, $E_W$ and power density can be increased. However, the use of such concentrated acidic and basic solutions poses a risk for the users in cases of a leakage.

Furthermore, $BH_4^-$ decomposes in contact with Pt and produces hydrogen gas, which can be dangerous for the users, and further reduces the cell's efficiency.

The fuel cell system of the present embodiments uses ammonia borane (AB) as fuel, and is characterized by the same power density as $NaBH_4$. Yet, unlike $NaBH_4$, AB is stable in water solutions, which allows simplifying the cell design.

The present inventors have searched for a fuel cell that would operate with an increased $E_{OCP}$, e.g., of about −1.8-2.0 V, and an increased working potential ($E_W$), e.g., of about 2 V. The present inventors have realized that to this effect, the anode and cathode should be selected such that their overpotentials ($\Delta E_A$ and $\Delta E_C$) are dramatically decreased by a range of 200-300 mV (as compared to currently known AB-based or hydrogen peroxide-based fuel cells).

The overpotentials of the anode and cathode ($\Delta E_A$ and $\Delta E_C$) depend on the electrode kinetics, catalyst material, mass transport conditions, electrode structure, fuel concentration, fuel viscosity and background electrolyte properties (electrical conductivity).

As used herein and in the art, the phrase "open circuit potential", denoted as $E_{OCP}$, describes the potential measured between an anode and a cathode when there is no external load, namely, no current is applied to or formed in the cell.

As used herein and in the art, the phrase "working potential", denoted as $E_W$, is the potential measured in an electrochemical cell (between anode and cathode) when current is applied to or formed in the cell.

As used herein and in the art, the term "overpotential", denoted as $E_{OP}$, is the potential at which a redox reaction occurs in the presence of one catalyst as compared to another catalyst. In other words, an overpotential reflects the effect of replacing a catalyst on the potential required for an electrochemical process to occur.

Embodiments of the present invention are based on the surprising findings uncovered (partially by serendipity) while searching for fuel cells that would outperform currently known fuel cells.

The present inventors have envisioned that fuel cells that are based on ammonia borane or derivatives thereof as fuel, and a peroxide such as hydrogen peroxide as oxidant, would exhibit an improved performance. Such a system can be described as $AB/H_2O_2$. An $AB/H_2O_2$ fuel cell is characterized by theoretical energy of 15,500 W/kg and a pure compound capacity of 9,600 Ah/kg (see, Demirci and Miele, 2009, supra). In addition, an ammonia borane-based fuel cell is advantageous over sodium borohydride fuel cells, for example, by being stable in aqueous solutions.

While recognizing the disadvantageous associated with currently utilized PGM (Pt group metal) catalysts for electro-oxidation of hydride-containing fuels such as ammonia borane fuel, described supra, the present inventors have further studied the effect of other catalysts on the electro-oxidation of ammonia borane.

While reducing the present invention to practice, the following surprising findings were uncovered:

Fuel cells which utilize ammonia borane as fuel and hydrogen peroxide as an oxidant are highly efficient;

Fuel cells which utilize ammonia borane as fuel act efficiently when a non-noble catalyst is used in the anode and/or cathode compartment thereof;

Fuel cells which utilize ammonia borane as fuel exhibit a higher efficiency when a catalyst of the Au group metals, namely, gold (Au), silver (Ag) and copper (Cu) is used to electro-oxidize the fuel, as compared to platinum (Pt) or platinum group metals (PGM) catalysts;

Fuel cells which utilize ammonia borane as fuel exhibit the highest power when a copper catalyst is used to electro-oxidize the fuel;

Fuel cells which utilize ammonia borane as fuel exhibit an even higher power when a copper catalyst made of copper nanoparticles is used to electro-oxidize the fuel;

Fuel cells which utilize ammonia borane as fuel exhibit a high efficiency when a non-metallic catalyst is used for electro-reducing the oxidant;

Fuel cells which utilize ammonia borane as fuel and a catalyst of the Au group for electro-oxidation of the fuel can operate also when an alkaline aqueous solution that comprises a concentration of an alkali substance that is substantially lower than the concentration required for PMG catalysts; and Fuel cells which utilize ammonia borane as fuel can operate with a non-noble catalyst for electro-oxidation of the fuel while maintaining the catalyst substantially non-oxidized.

Hence, according to an aspect of some embodiments of the invention there are provided fuel cell systems. Each of the fuel cell systems provided herein comprises an anode compartment, a cathode compartment and a separator interposed between the cathode and the anode compartments, whereby the anode compartment comprises a compound represented by the formula: $R_1R_2R_3N-BR_4R_5R_6$, as fuel, wherein each of $R_1$-$R_6$ is independently selected from the group consisting of hydrogen, alkyl, alkenyl, alkynyl, haloalkyl, cycloalkyl, heteroalicyclic, alkoxy, thioalkoxy, and amine, provided that at least one of $R_4$, $R_5$ and $R_6$ is hydrogen.

The term "alkyl" describes a saturated aliphatic hydrocarbon including straight chain and branched chain groups. In some embodiments, the alkyl group has 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. In some embodiments, the alkyl is a medium size alkyl having 1 to 10 carbon atoms. In some embodiments, the alkyl is a lower alkyl having 1 to 4 carbon atoms.

The term "alkenyl" describes an alkyl, as defined herein, which has at least 2 carbon atoms and at least one unsaturated double bond.

The term "alkynyl" describes an alkyl, as defined herein, which has at least 2 carbon atoms and at least one unsaturated triple bond.

The term "cycloalkyl" describes an all-carbon monocyclic or fused ring (i.e., rings which share an adjacent pair of carbon atoms) group where one or more of the rings does not have a completely conjugated pi-electron system.

The term "haloalkyl" describes an alkyl group as defined above, further substituted by one or more halide.

The term "alkoxy" describes both an —O-alkyl and an —O-cycloalkyl group, as defined herein.

The term "thiohydroxy" describes a —SH group.

The term "thioalkoxy" describes both a —S-alkyl group, and a —S-cycloalkyl group, as defined herein.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofurane, tetrahydropyrane, morpholino and the like.

As used herein, the term "amine" describes a —NR'R" group, wherein R' and R" are each independently hydrogen, alkyl or cycloalkyl, as these terms are defined herein.

Alternatively, one or more of $R_1$-$R_6$ can be a carboxy, a ketone or an amide.

The term "carboxy" describes a —C(=O)—OR' group, wherein R' is as described herein.

The term "ketone" describes a —C(=O)—R' group, wherein R' is as described herein.

The term "amide" describes a —C(=O)—NR'R", wherein R' and R" are as described herein.

It is noted that the fuel described herein produces electrons upon an electro-oxidation that is enabled by the presence of one or more hydride anions. Accordingly, the fuel cell efficiency depends, at least in part, on the number of electrons produced in the electro-oxidation process, which in turn, depends on the number of potential hydrides in the fuel. By "potential hydrides" it is meant to describe hydrogen atoms that have at least a partial negative charge and hence can function as electron donating groups.

Accordingly, in some embodiments, at least two of $R_4$, $R_5$ and $R_6$ are hydrogen.

In some embodiments, each of $R_4$, $R_5$ and $R_6$ is hydrogen.

Accordingly, in some embodiments the fuel is $R_1R_2R_3N$—$BH_3$, with $R_1$, $R_2$ and $R_3$ as defined herein.

In some embodiments, at least one of $R_1$, $R_2$ and $R_3$ is hydrogen.

In some embodiments, at least two of $R_1$, $R_2$ and $R_3$ are hydrogen.

In some embodiments, each of $R_1$, $R_2$ and $R_3$ is hydrogen.
In some embodiments, the fuel is $R_1R_2HN$—$BHR_4R_5$.
In some embodiments, the fuel is $R_1H_2NBH_2R_4$.

In some embodiments, the fuel is ammonia borane, $H_3NBH_3$, which is also presented herein and in the art as $NH_3BH_3$, and is also referred to herein and in the art as AB.

In some embodiments, a salt, hydrate or solvate of the fuel described herein is contemplated.

The term "solvate" refers to a complex of variable stoichiometry (e.g., di-, tri-, tetra-, penta-, hexa-, and so on), which is formed by a solute (hydrazine or a derivative thereof) and a solvent, whereby the solvent does not interfere with the electrochemical activity of the solute.

The term "hydrate" refers to a solvate, as defined hereinabove, where the solvent is water.

The term "salt" describes a complex of a compound with an inorganic salt. For example, a sulfate salt or a halogenid salt.

For the sake of simplicity, whenever ammonia borane is referred to herein throughout, it is to be understood that any of the above-described derivatives, salts, hydrates and solvates of ammonia borane is also contemplated.

Accordingly, the fuel cell systems described herein are also referred to as ammonia borane-based fuel cells, and encompass both ammonia borane and/or its derivatives as described herein, as fuel.

In some embodiments, the fuel cell system described herein comprises a precursor of ammonia borane, that is, a compound which can be readily converted to ammonia borane (e.g., by hydrolysis), and thus generate the fuel, in situ. In some embodiments, such a precursor is in solid form.

In some embodiments, the precursor generates ammonia borane by hydrolysis and/or thermal treatment (e.g., heating).

In some embodiments, the precursor is kept in a reactor which is operatively connected to the fuel cell system. The reactor serves for storing the precursor and/or for generating the fuel, which, once generated, is introduced (supplied) into the fuel cell (to the anode compartment).

Figure 1B:
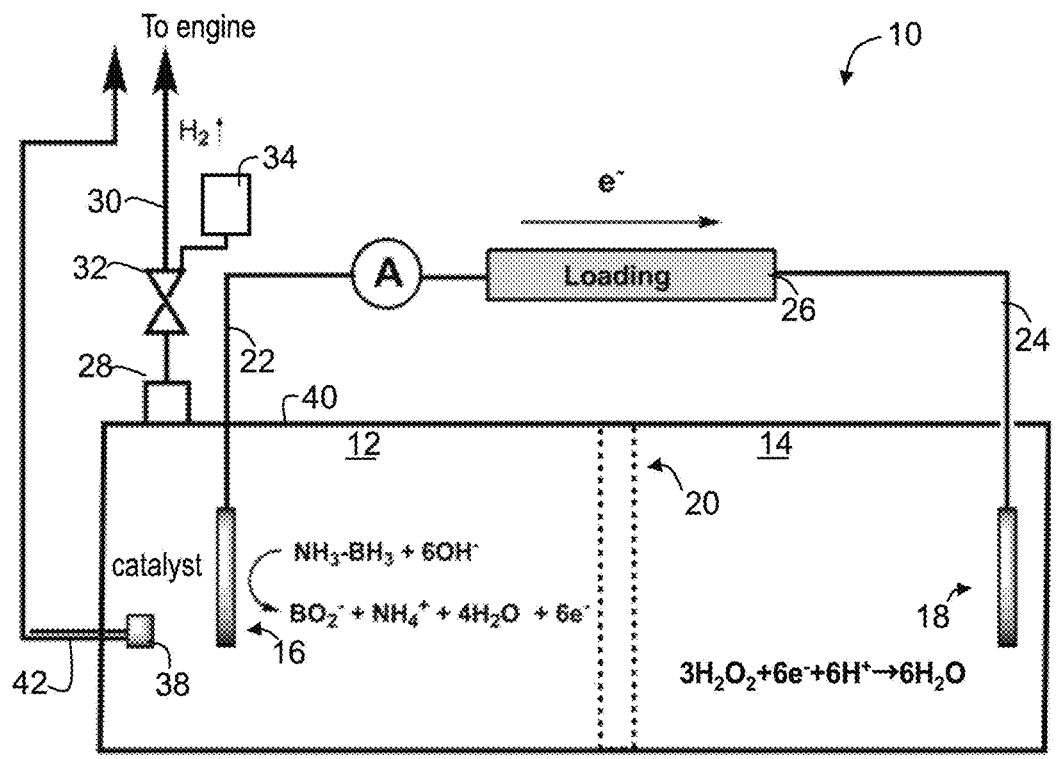

Referring now to the drawings, FIGS. 1A and 1B illustrate a fuel cell 10 according to some embodiments of the invention. In the representative example illustrated in FIGS. 1A and 1B fuel cell 10 is made-up of an anode compartment 12 and cathode compartment 14.

Referring to FIG. 1A, cell 10 generally comprises anode compartment 12, cathode compartment 14 and separator 20.

Anode compartment 12 comprises an anode 16 and a liquid fuel composition 44 at least partially filling compartment 12. Anode 16 or part thereof (e.g., the lower part) is kept in contact with liquid fuel composition 44 at all times. Anode 16 comprises an electrode 48 and a catalyst layer 50, which is typically deposited on the surface of electrode 48, preferably at the part which is in contact with fuel composition 44.

Since the electric energy is generated in anode compartment 12, it is desired to have an anode with a catalyst layer that has a high surface area.

Herein throughout, an electrode (anode or cathode) that comprises a catalyst layer is also referred to as a catalyst-containing electrode. Thus, in various exemplary embodiments of the invention anode 16 is a catalyst-containing electrode.

The fuel composition of some embodiments of the invention comprises an ammonia borane and/or a derivative thereof, as described herein, dissolved or suspended in an aqueous solution (e.g., an anode electrolyte). In these embodiments, the aqueous solution preferably comprises an alkaline substance such as, for example, a metal alkali hydroxide, as discussed in detail hereinunder.

Cathode compartment 14 comprises a cathode 18 and an oxidant composition 46 at least partially filling compartment 14. Cathode 18 or part thereof (e.g., the lower part) is kept in contact with oxidant composition 46 at all times. Cathode 18 comprises an electrode 52 and a catalyst layer 54. Catalyst layer 54 is typically deposited on the surface of electrode 52, preferably on the part which is in contact with oxidant composition 46.

The oxidant composition of the present embodiments comprises an oxidant and is optionally dissolved or suspended in a solution (e.g., a cathode electrolyte). The oxidant composition can be in a liquid phase or is a gas phase. When in a gas phase (e.g., $O_2$ in air), the cathode compartment further comprises a means for introducing the oxidant, such as, for example, a fan or an air pump (not shown). Alternatively, the cathode compartment can be filled, at least partially, with a solution containing the oxidant. It is noted that when the oxidant is, for example, oxygen, it can be dissolved in an aqueous composition.

In some embodiments of the present invention separator 20 comprises a solid separator 56 and an electrolyte membrane 58. The separator can be ionically conductive or non-conductive, as desired. When ionically conductive, the separator can be conductive for cations, anions or both. In various exemplary embodiments of the invention the separator is electrically non-conductive.

The nature and characteristics of the anode, cathode, catalyst layers, oxidants, solutions and separators, as well as of other components that can be added to the anode and/or cathode compartments, or to the system as a whole, are further detailed hereinbelow.

The distances between the anode, cathode, separator, fuel cell walls, and other components can be manipulated and are generally as would be recognized by a person skilled in the art.

An exemplary embodiment of fuel cell 10 is illustrated in FIG. 1B. It is to be understood that although the description below is with reference to FIG. 1B, any of the described embodiments can be independently incorporated in the fuel cell as described above and illustrated in FIG. 1A.

In some embodiments of the invention, anode compartment 12 comprises anode 16, a catalyst, a fuel composition and an alkaline aqueous solution. In various exemplary embodiments of the invention the catalyst is a copper catalyst. In the representative example illustrated in FIG. 1B, the fuel is an ammonia borane fuel.

Cathode compartment 14 comprises cathode 18, and an oxidant. In the representative example illustrated in FIG. 1B, the oxidant is hydrogen peroxide. In some embodiments, cathode compartment 14 further comprises an acidic aqueous solution Fuel cell 10 can further comprise a separator 20, interposed between anode compartment 12 and cathode compartment 14. In various exemplary embodiments of the invention fuel cell 10 further comprises electrical leads 22 and 24 for connecting electrodes 16 and 18 to an electric load 26 so as to supply electrical energy thereto. Upon such connection, electrons begin to flow from electrode 16 via load 26 to electrode 18, as indicated by an arrow in FIG. 1B. The electrical current flowing in the thus closed electrical circuit can be measured and optionally monitored using a current measuring device 36 connected in serial to load 26. Other parameters, such as voltage, can also be measured, if desired, as known in the art.

During the electrochemical reaction within compartment 12, hydrogen gas may be produced as side product, as a result of a chemical side reaction that involves dehydrogenation of the fuel and results in hydrogen generation. Gaseous ammonia can also be formed during operation of the fuel cell. In some embodiments of the invention fuel cell 10 further comprises a gas outlet 28 located on a wall 40 of cell 10 at the side of anode compartment 12, for allowing evacuation of the hydrogen gas and/or gaseous ammonia out of anode compartment 12. A particular advantage of the present embodiment is that the hydrogen gas can be used as a fuel component, for example, in a hydrogen-driven engine (not shown) or the like. Thus, in some embodiments of the present invention the hydrogen gas is conveyed, e.g., by means of a gas convey tube 30, to the engine or any other external location. Optionally and preferably the flow of hydrogen gas through outlet 28 is controlled by a valve 32. Valve 32 can be operated manually or automatically by a controller 34.

Optionally and preferably, the electrochemical reaction within compartment 12 is monitored, for example, by means of an electrochemical unit 38 located in compartment 12. Electrochemical unit 38 comprises a catalyst layer suitable for the electrochemical process occurring in the fuel cell. The catalyst can be identical or different from the catalyst layer of anode 16. Unit 38 can be configured to measure any parameter pertaining to the operation and/or state of cell 10. These include, without limitation, $E_{OCP}$, which is indicative of the fuel concentration and/or viscosity, and the like.

Electrical signals generated by unit 38 can be transmitted, e.g., via communication line 42 to a remote location (not shown).

In some embodiments, a fuel cell system, as described herein, further comprises a chamber for supplying the fuel to the anode compartment, which is operatively connected to the anode compartment and is configured to provide the fuel composition to the anode. In some embodiments, the fuel cell system further comprises a chamber for supplying the oxidant to the cathode compartment, which is operatively connected to the cathode compartment and is configured to provide the oxidant composition to the cathode.

In some embodiments, a fuel cell system as described herein, is configured as a battery system. A battery system does not comprise chambers for supplying fuel and/or oxidant.

In some embodiments, the fuel cell system described herein is a liquid direct fuel cell.

In some embodiments, the fuel cell system described herein operates at room temperature, although higher temperatures are also contemplated.

As delineated hereinabove, the cathode compartment comprises an oxidant. The present inventors have uncovered that, as opposed to other methodologies which utilize oxygen as an oxidant in ammonia borane-based fuel cells, a fuel cell that utilizes ammonia borane or derivatives thereof as fuel and a peroxide such as hydrogen peroxide as an oxidant, operates in high efficiency.

Hence, according to an aspect of some embodiments of the invention there is provided a fuel cell system which comprises an anode compartment which comprises ammonia borane or derivatives thereof, as described herein, as fuel, a cathode compartment that comprises a peroxide as an oxidant and a separator interposed between the cathode and anode compartments.

In some embodiments, the peroxide used as an oxidant in the cathode compartment is hydrogen peroxide. As discussed hereinabove, hydrogen peroxide is a highly potent oxidant.

However, other peroxides are contemplated, including, as non-limiting examples, benzoyl peroxide, dicumyl peroxide, lauroyl peroxide, and the like.

The cathode compartment can further comprise an electrolytic aqueous solution in which the peroxide is dissolved. Such a composition is also referred to herein as oxidant composition. In some embodiments, the oxidant composition comprises an acid, as is further detailed hereinunder.

The fuel cell according to these embodiments of the invention is based on anodic oxidation of the fuel (e.g., AB) and cathodic oxidation of the peroxide (e.g., hydrogen peroxide), as exemplified in the following equations:

anode: $NH_3BH_3 + 6OH^- \rightarrow BO_2^- + NH_4^+ + 4H_2O + 6e^-$ (A)

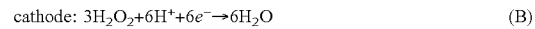

cathode: $3H_2O_2 + 6H^+ + 6e^- \rightarrow 6H_2O$ (B)

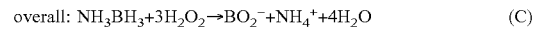

overall: $NH_3BH_3 + 3H_2O_2 \rightarrow BO_2^- + NH_4^+ + 4H_2O$ (C)

As demonstrated in the Examples section that follows, the present inventors have surprisingly uncovered that ammonia borane-based fuel cells exhibit an improved performance when catalysts other than platinum (Pt) or platinum group metals (PGM) are utilized.

Accordingly, according to an aspect of some embodiments of the invention there is provided a fuel cell comprising an anode compartment, which comprises ammonia borane or a derivative thereof as fuel, as described herein, a cathode compartment, which comprises an oxidant, and a separator interposed between the cathode and the anode compartments, as described herein, wherein at least one of the anode and the cathode comprises a catalyst layer that is devoid of platinum (Pt) or a platinum group metal (PGM).

As used herein and in the art, the phrase "platinum group metals", abbreviated PGM, collectively refers to six metallic elements clustered together in the periodic table, which include ruthenium, rhodium, palladium, osmium, iridium, and platinum.

In some embodiments, both the anode and the cathode comprise a catalyst layer that is devoid of platinum or a platinum group metal.

As used herein throughout, the phrase "devoid of" encompasses the presence of minute amounts of the indicated substance (for example, less than 0.1% by weight, less than 0.01% by weight, and less than 0.001% by weight), as well as the complete absence of the indicated substance.

The disadvantages associated with fuel cells based on hydride-containing fuels which utilize Pt or PGM as catalysts, as well as the disadvantages associated with utilizing Pt or PGM as catalysts in any fuel cell system, are set forth hereinabove. Hence, a fuel cell in which at least one of the anode and cathode is devoid of such catalysts circumvents at least some of the limitations associated with these catalysts.

A non-limiting example of the advantages of utilizing catalysts devoid of Pt or PGM is the ability to use a fuel composition that comprises an alkaline solution in which the concentration of the alkaline substance can be lower even by a factor of 10 (an order of magnitude) than that required with Pt or PMG catalysts.

As discussed hereinabove, Pt and PMG catalysts require high pH values for operating, as otherwise, such catalysts are highly unstable. As further discussed hereinabove, fuel cells that utilize Pt— or PMG-containing electrodes and hydride-containing fuels often include a highly basic solution in the anode compartment and a highly acidic solution in the cathode compartment, thus posing a safety problem to the end user, in case of leakage of the electrolyte membrane.

In addition, Pt and PGM are beneficially avoided due to cost considerations. Platinum, for example, is considered a precious metal, as defined hereinafter.

Utilizing at least one of an anode and a cathode that is devoid of Pt or PMG is therefore beneficial.

Pt and PMG catalysts, however, are known to exhibit a very good overpotential in fuel cell reactions.

Hence, the present inventors were surprised to uncover, in a search for alternative catalysts, that while utilizing ammonia borane or derivatives thereof as fuel, and Au group metals, namely, gold (Au), silver (Ag) and copper (Cu), as catalysts, the cell exhibits an $E_{OCP}$ that is higher than that of Pt and PMG.

Accordingly, according to another aspect of embodiments of the invention there is provided a fuel cell system that comprises an anode compartment, which comprises ammonia borane or a derivative thereof, as described herein, as fuel, a cathode compartment, which comprises an oxidant or an oxidant composition, as described herein, and a separator interposed between the cathode and the anode compartments, whereby at least one of the anode and the cathode comprises a catalyst layer that comprises at least one of copper, silver, gold and an alloy of at least one or at least two of silver, gold and copper, as detailed herein).

The present inventors have further surprisingly uncovered that the most efficient performance of the fuel cell was achieved while utilizing a catalyst layer that comprises copper.

Hence, in some embodiments, the catalyst layer in the anode compartment comprises copper.

In some embodiments, whenever copper, silver or gold is utilized as the catalyst layer, the metal has a purity greater than 99%, greater that 99.9% and even greater than 99.99%.

In some embodiments, an alloy of these Au group metals is utilized. The alloy can include, for example, a mixture of gold and silver, of gold and copper, of silver and copper and of gold, silver and copper. Alternatively, the alloy can include a mixture of any of gold, silver and/or copper, and another metal. In each of these alloys, the weight percentage of each metal can range from 0.01% to 99.99% or from 1% to 99%, by weight.

Whenever copper, silver, gold or an alloy of at least one or two of copper, silver and gold, is utilized as the catalyst layer, the catalyst layer can be in a form of, for example, a plate, a rod, a mesh, granules or particles. Other forms are also contemplated. The catalyst layer can be in a form of, for example, a plate, a rod, a mesh, granules or particles. Other forms are also contemplated.

When being in a form of a mesh, in some embodiments, the mesh is characterized by a grid that ranges from 0.1 mm to 1 mm. The mesh can further be composed of wires that have a diameter in the range of 50-100 µm. The number and density of the wires in the grid can be manipulated, so as to obtain desired parameters (e.g., surface area).

The mesh, according to some embodiments of the invention, is characterized by high surface area (as compared, for example, to a plate or a rod), and can be regarded as having a morphology similar to microparticles.

In some embodiments, the catalyst layer containing copper or an alloy thereof is in a form of particles.

In some embodiments, the catalyst layer containing copper or an alloy thereof has a microstructure or a nanostructure.

By "microstructure" it is meant that the catalyst layer comprises microparticles or has morphological properties that resemble microparticles, as in the case of a mesh structure, as described herein.

"Microparticles", as used herein, describe particles of any shape, which have a size less than 1,000 microns (µm).

"Nanoparticles", as used herein, describe particles of any shape, which have a size less than 1,000 nm.

By "nanostructure" it is meant that the catalyst layer comprises nanoparticles or has morphological properties that resemble microparticles, obtained, for example, by forming a mesh nanostructure.

In some embodiments, the catalyst layer containing copper or an alloy thereof is in a form of nanoparticles. In some embodiments, the nanoparticles have a size that ranges from 10 nm to 500 nm. The nanoparticles can be round-shaped (e.g., spherical) nanoparticles, or can be in shaped as nanorods, having a size of 10-100 nm, as an example, or as nanowires, having a size of 10-100 nm, as an example. When spherical nanoparticles are used, the nanoparticles are typically deposited on a support, preferably a conductive support such as a carbon support, titanium support or Ni-foam support, or on a Cu electrode. In some embodiments, spherical nanoparticles have a diameter of, for example, 10-100 nm. The nanoparticles can also include a mixture of round-shaped, nanorods and/or nanowires.

Using a catalyst layer in a form of nanoparticles provides for enhanced surface area of the catalyst layer, and further provides nano-roughness, which impart improved electrochemical properties to the cell, as exemplified in the Examples section that follows (see, for example, Example 2).

In some embodiments, the anode comprises a catalyst layer that comprises gold, copper, silver or an alloy of at least two of copper, gold and silver.

In some embodiments, both the anode and cathode comprise a catalyst layer that comprises gold, copper, silver or an alloy of at least two of copper, gold and silver.

In some embodiments, the anode comprises a copper catalyst layer and the cathode comprises a silver catalyst layer.

Optionally, the anode comprises a copper catalyst layer and the cathode comprises a gold catalyst layer.

Optionally, the anode comprises a gold catalyst layer and the cathode comprises a silver catalyst layer.

Optionally, both the anode and cathode comprise a silver catalyst layer.

Optionally, both the anode and cathode comprise a copper catalyst layer.

Further optionally, the anode comprises an alloy of copper and gold as a catalyst layer.

In some embodiments, the catalyst layer consists of any of the above-mentioned copper, gold, silver or of an alloy of any of copper, gold and silver.

According to some embodiments of the invention, the fuel cell system presented herein comprises an anode compartment, a cathode compartment and a separator interposed therebetween, wherein the anode compartment comprises ammonia borane or a derivative thereof, as described herein, as fuel, and the anode comprises a catalyst layer that is devoid of Pt or PGM.

According to some embodiments of the invention, the fuel cell system presented herein comprises an anode compartment, a cathode compartment and a separator interposed therebetween, wherein the anode compartment comprises ammonia borane or a derivative thereof, as described herein, as fuel, and the anode comprises a catalyst layer that comprises gold, copper, silver or an alloy of at last two of gold, copper and silver, as described herein.

Since copper is a non-precious metal, and is further considered as non-noble metal due to its relative tendency to oxidize, its use in constructing a fuel cell is cost effective and hence beneficial. In addition, as shown in Tables 1 and 2 in the Examples section that follows, an ammonia borane-based fuel as described herein was found to exhibit the most improved performance when an anode containing copper as the catalyst layer was used.

Hence, according to some embodiments of the invention, the fuel cell system presented herein comprises an anode compartment, a cathode compartment and a separator interposed therebetween, wherein the anode compartment comprises ammonia borane or a derivative thereof, as described herein, as fuel, and the anode comprises a catalyst layer that comprises copper.

In some embodiments, the anode comprises a catalyst layer that consists of copper.

In some embodiments, the copper catalyst layer is in a form of nanoparticles, as described herein.

In each of the embodiments described herein, the cathode in the fuel cell system can comprise any catalyst layer that is suitable for use in an ammonia borane-based fuel cell, with the respective oxidant, so as to catalyze the electroreduction of the oxidant.

Exemplary catalyst layers that are suitable for use in the context of these embodiments of the invention include, but are not limited to, a catalyst layer that comprises copper, silver, gold or an alloy of at least one or two of gold, silver and copper, as described herein; a catalyst layer that comprises platinum or PGM; a catalyst layer that comprises $MnO_2$; a catalyst layer that comprises other oxides of suitable transition metals; and a catalyst layer that comprises $PbSO_4$.

As delineated hereinabove, is some embodiments, the cathode comprises a catalyst layer that comprises gold, silver and/or copper.

In some embodiments, the cathode comprises a catalyst layer that comprises silver. The silver can be in a form of a plate, a mesh or nanoparticles, or any other form, as described herein.

In some embodiments, a cathode that comprises silver as the catalyst layer, deposited on a support such as Ni-foam or Ni-mesh, is used.

In some embodiments, the cathode comprises a catalyst layer that comprises gold. The gold can be in a form of a plate, a mesh or nanoparticles, or any other form, as described herein.

In some embodiments, the cathode comprises a catalyst layer that comprises an alloy of gold and silver, with a gold content that ranges from 1% to 99% by weight. The alloy can be in a form of a plate, a mesh or nanoparticles, or any other form, as described herein.

In some embodiments, the cathode comprises a catalyst layer which is, or which comprises, a non-metallic substance.

As used herein, the phrase "a non-metallic substance" encompasses any compound that does not include an unbound metal, namely, a metal in its zero oxidation state, which is not coordinatively bound to a ligand. The phrase "non-metallic substance" therefore encompasses, for example, organic substances, inorganic substances and metallic complexes.

In some embodiments, the non-metallic substance can act as an electron-transfer mediator.

The phrase "electron-transfer mediator", which is also referred to herein interchangeably as "electron-transfer mediating substance" describes a substance that can participate in a redox reaction, via, for example, a reversible change in its electronic configuration. Thus, an electron-transfer mediator is typically a compound that can form a redox couple, or, in other words, a mixed valence compound.

Exemplary organic substances that can act as electron-transfer mediators and which are suitable for use in this context of embodiments of the invention include, but are not limited to, quinone or its derivatives, organic conducting salts, or viologen.

Representative examples include, but are not limited to, 7,7,8,8-tetracyanoquinodimethane, tetrathiafulvalene, N-methylacridinium, tetrathiatetracene, N-methylphenazinium, hydroquinone, 3-dimethylaminobenzoic acid, 3-methyl-2-benzothiazolinone hydrazone, 2-methoxy-4-allylphenol, 4-aminoantipyrin, dimethylaniline, 4-aminoantipyrene, 4-methoxynaphthol, 3,3',5,5'-tetramethylbenzidine, 2,2-azino-di-[3-ethylbenzthiazoline sulfonate], o-dianisidine, o-toluidine, 2,4-dichloro phenol, 4-aminophenazone, and benzidine.

As used herein, the phrase "metal complex", also referred to herein and in the art as "a coordination compound", describes a metal having attached thereto, via coordinative bonds, one or more ligands. Typically, the metal in the metal complex is ionized, and further typically, the metal is ionized such that its oxidation state is higher than in its natural form (non-ionized). The number of coordinative bonds depends on the size, charge, and electron configuration of the metal ion and the ligands. The metal in the metal complex can be any metal in the periodic table, including alkali metals, alkali earth metals, transition metals, actinides, lanthanides, etc. In some embodiments, the metal is a transition metal.

The phrase "metal complex", as used herein, encompasses inorganic complexes, in which the ligands in the complex are inorganic (e.g., —OH, —NO, —CO, —CN, etc.) and organic complexes (also referred to herein and in the art as organometallic complexes), in which at least one of the ligands in the complex is organic (e.g., cyclopentadienyl, ethylene, etc.).

The phrase "metal complex", as used herein, does not encompass metals that are not coordinatively bound to at least one ligand.

In some embodiments, the metal complex described herein is capable of acting as a charge-transfer mediator, e.g., an electron-transfer mediator, as described herein.

The phrase "electron-transfer mediator" in this context of the present embodiments therefore describes a metal complex, as described herein, in which the metal, a ligand or both can participate in a redox reaction.

Exemplary ligands that can participate in a redox reaction include ligands with two lone electron pairs, which can act as bridging ligands between two coordination centers, thus allowing electron transfer from one center to another.

Exemplary metals that can participate in redox reactions include metals that can adopt two or more oxidation states. Non-limiting examples include Iron ($Fe^{+2}/Fe^{+3}$), Chromium (Cr), Nickel (Ni) and Cobalt (Co).

In some embodiments, the metal complexes described herein can act as electron-transfer mediators by including a metal that can exist in two or more oxidation sates, as described herein. Non-limiting examples include iron complexes such as Prussian blue, ferrocene, potassium ferricyanide, potassium ferrocyanide, dimethylferrocene, ferricinium, ferocene-monocarboxylic acid, nickel complexes such as nickelocene, and other complexes of transition metals.

In some embodiments, the metal complexes described herein are iron complexes.

In some embodiments, the metal complex described herein is Prussian blue (an inorganic electron-transfer mediating metal complex).

In some embodiments, the metal complex described herein is ferrocene (an organic electron-transfer mediating metal complex).

In some embodiments, the non-metallic substance described herein is deposited on an organic conductive support, typically a carbon support such as, but not limited to, carbon cloth, carbon foil, carbon felt, carbon paper, and glassy carbon, as well as graphite rods, granules, or reticulated vitreous carbon (RVC), thus forming a non-metallic electrode. Other organic, inorganic or metallic conductive supports are also contemplated.

In some embodiments, the amount of the non-metallic catalyst layer in a non-metallic (e.g., carbon-based) electrode ranges from 0.01% to 1.5% by weight, of the total weight of the electrode.

As demonstrated in the Examples section that follows (see, Example 3), the present inventors have surprisingly uncovered that an ammonia borane-based fuel cell that comprises a metal complex as the catalyst layer, deposited on a carbon support, in the cathode, exhibits an exceptional performance. Ammonia borane-based fuel cells that comprise a non-metallic substance (e.g., a metal complex), as a catalyst layer, and which can be conveniently prepared and efficiently utilized, have never been described heretofore.

Electrodes comprising a non-metallic substance as a catalyst layer, and an organic support are highly cost-effective, particularly when compared to precious metal-containing electrodes, and further are characterized by simple preparation and storage.

Hence, according to an aspect of some embodiments of the invention, there is provided a fuel cell system which comprises an anode compartment comprising ammonia borane or derivatives thereof as fuel, as described herein, a cathode compartment comprising a cathode which comprises a catalyst layer which is a non-metallic substance, and a separator, as described herein.

According to some embodiments of the invention, the non-metallic substance composing the catalyst layer in the cathode is a metal complex as described herein.

In some embodiments, the metal complex is ferrocene.

In some embodiments, the metal complex is Prussian Blue.

In some embodiments, whenever the cathode in the fuel cell system comprises a catalyst layer than comprises a metal complex or any other non-metallic substance, as described herein, the anode can comprise any catalyst layer that is suitable for use in ammonia borane-based fuel cells.

Exemplary anode catalyst layers that are suitable for use in the context of these embodiments of the invention include, but are not limited to, copper, gold, silver, and an alloy of at least one or two of gold, silver and copper, as described herein; and Pt or PGM catalysts.

In some embodiments, the anode comprises a catalyst layer which comprises copper, gold, silver, and an alloy of at least one or two of gold, silver and copper, as described herein.

In some embodiments, the anode comprises a catalyst layer which comprises copper, as described herein.

The present inventors have therefore devised and successfully prepared and practiced a fuel cell system in which at least one of the anode and cathode therein, or even both the anode and cathode therein, is a non-noble metal or a metal complex.

Accordingly, according to an aspect of some embodiments of the invention there is provided a fuel cell system comprising an anode compartment, which comprises ammonia borane or derivatives thereof as fuel, a cathode compartment, and a separator interposed between the cathode and the anode compartments, whereby at least one of the anode and the cathode comprising a catalyst layer that comprises a non-noble metal and/or a non-metallic substance.

According to an aspect of some embodiments of the invention there is provided a fuel cell system comprising an anode compartment, which comprises ammonia borane or derivatives thereof as fuel, a cathode compartment and a separator interposed between the cathode and the anode compartments, whereby at least one of the anode and the cathode comprises a catalyst layer that is devoid of a noble metal.

Accordingly, according to an aspect of some embodiments of the invention there is provided a fuel cell system comprising an anode compartment, which comprises ammonia borane or derivatives thereof as fuel, a cathode compartment and a separator interposed between the cathode and the anode compartments, whereby at least one of the anode and the cathode comprises a catalyst layer that comprises a non-precious metal and/or a non-metallic substance.

According to an aspect of some embodiments of the invention there is provided a fuel cell system comprising an anode compartment, which comprises ammonia borane or derivatives thereof as fuel, a cathode compartment and a separator interposed between the cathode and the anode compartments, whereby at least one of the anode and the cathode comprises a catalyst layer that is devoid of a precious metal.

As used herein and in the art, the phrase "noble metal" describes a metallic element with marked resistance to chemical reactions, particularly to chemical reactions that involve ionization such as oxidation and dissolution by e.g., inorganic acids. Non-limiting examples include platinum, gold and silver. The phrase "noble metal" encompasses precious metals.

The phrase "precious metal" describes a rare metallic element of high economic value, such as gold and platinum.

The phrase "non-noble metal" describes a metal which is a non-noble metal, and encompasses all metallic elements that are not defined as noble metals, and which are prone to chemical reactions such as oxidation and dissolution by e.g., inorganic acids. The phrase "non-noble metal" encompasses metallic elements other than, for example gold, silver and platinum.

The phrase "non-precious metal" describes metallic elements that are not of high economic value, and encompasses metallic elements other than, for example, gold and platinum.

In some embodiments, the non-metallic substance is a metal complex, including an organometallic complex and an inorganic complex, or an organic substance, as described herein.

In some embodiments, the anode comprises a catalyst layer that comprises a non-noble metal or a non-precious metal.

In some embodiments, the non-noble metal and/or the non-precious metal is copper.

Copper is known as a non-precious metal and is defined herein as a non-noble metal, since it is relatively susceptible to oxidation.

Thus, in some embodiments, the anode comprises a catalyst layer that comprises copper or an alloy thereof.

A copper alloy can comprise from 0.01% to 99.99%, or from 1% to 99%, by weight, copper.

Exemplary copper alloys include, but are not limited to, an alloy of copper and gold, an alloy of copper and silver, and an alloy of copper, silver and gold.

The copper can be in a form of a plate, a mesh and/or nanoparticles, or any other form, as described herein.

In some embodiments, when the anode comprises a non-noble and/or non-precious metal, the cathode comprises any of catalyst layers described herein. In some embodiments, the cathode also comprises a catalyst layer that comprises a non-noble or non-precious metal and/or a non-metallic substance, as described herein.

In some embodiments, the cathode comprises a catalyst layer which is a non-metallic substance, as described herein. In these embodiments, the anode comprises any of the catalyst layers described herein.

In some embodiments, each of the anode and the cathode comprises a catalyst layer that comprises a non-noble metal, a non-precious metal and/or a non-metallic substance, as described herein.

In some embodiments, the anode comprises a catalyst layer that comprises copper and the cathode comprises a catalyst layer that comprises a non-metallic substance, as described herein.

In some embodiments, the non-metallic substance is a metal complex, as described herein.

In some embodiments, the non-metallic substance is an iron complex such as, for example, ferrocene, or Prussian Blue.

Hence, according to an aspect of some embodiments of the invention there is provided a fuel cell system comprising an anode compartment, which comprises ammonia borane or a derivative thereof, as described herein, and an anode that comprises a catalyst layer that comprises copper or an alloy thereof, as described herein, a cathode compartment, which comprises a cathode that comprises a catalyst layer that comprises a non-metallic substance, as described herein (e.g., a metal complex such as an iron complex), and separator interposed between the anode and cathode compartments, as described herein.

In any of the fuel cell systems described herein, the cathode compartment further comprises an oxidant.

In some embodiments, the oxidant is a peroxide, as described herein.

Other oxidants that are suitable for use in combination with ammonia borane fuel are also contemplated. An example of a suitable oxidant is oxygen. Oxygen can be provided as a gas, by supplying air into the fuel cell system, or by providing an aqueous solution is which oxygen is dissolved, as an oxidant composition.

In any of the fuel cells described herein, the electrodes composing the anode and cathode are made of a conductive material, such as carbon, graphite, ceramics, conductive polymers, conductive metals, etc. The conductive material can be utilized as a coating of a support material, or can compose the electrode. An electric-insulating layer which coats a part of the electrode that does not have the catalyst layer deposited thereon is optional. In some embodiments, a gas-impermeable layer is deposited on the catalyst layer or on the entire electrode.

Exemplary support materials onto which the catalyst layer is deposited, so as to form the anode or cathode, include carbon support materials, as described hereinabove, nickel meshes, nickel foams, and the like.

The electrodes can be commercially available electrodes or can be prepared or modified as desired.

In some embodiments, the anode and/or the cathode is a chemically modified electrode, namely, an electrode made of a suitable conductive material, as described herein, which is further modified by reacting it with, for example, amine-containing and/or sulfur containing compounds. Non-limiting examples include substituted or non-substituted aniline or pyridine.

Chemically modified electrodes can be obtained from a commercial vendor or can be prepared as desired.

In some embodiments, chemical modification of the electrode(s) is made in order to prevent undesired reactions.

For example, as mentioned hereinabove, when ammonia borane or a derivative thereof is used as fuel, a side reaction in which ammonia borane is dehydrogenated so as to produce hydrogen can occur in the anode compartment. Evolution of gaseous ammonia can also occur.

This reaction is undesired as it is a chemically destroying reaction, in which some of the fuel irreversibly reacts chemically, which leads to a decrease in the fuel concentration and hence to a decreased efficiency of the cell. This reaction is further undesired since the evolution of hydrogen and/or ammonia as gas may reduce the cell efficiency.

Thus, is some embodiments, the anode is chemically modified by sulfur-containing compounds and/or amine-containing compounds, as described herein, which are known to inhibit the above-described chemically destroying reaction.

In any of the fuel cell systems described herein, the anode compartment comprises an anode having a catalyst layer deposited thereon and an aqueous solution which serves as a fuel composition, as described herein.

The fuel cell composition in the anode compartment comprises the fuel, as described herein, and an aqueous solution that serves as an anode electrolyte solution.

In some embodiments, the aqueous solution is an alkaline aqueous solution.

In some embodiments, the alkaline aqueous solution comprises a metal alkali hydroxide.

As shown in equations A-C hereinabove, hydroxide ions participate in the electrochemical reaction.

The metal alkali hydroxide can be, for example, sodium hydroxide, potassium hydroxide, lithium hydroxide, magnesium hydroxide, calcium hydroxide, strontium hydroxide and/or barium hydroxide.

In some embodiments, the metal alkali hydroxide is sodium hydroxide.

In some embodiments, a concentration of the metal alkali hydroxide in the aqueous solution ranges from 0.1M to 6M.

While a higher concentration of the metal alkali hydroxide can be utilized, it is undesired to have a high concentration of hydroxide ions, for reasons set forth hereinabove.

As further discussed hereinabove, while utilizing catalyst layers that are devoid of Pt or PGM, a lower concentration of hydroxide ions can be utilized, since there is no need to stabilize the Pt catalyst.

Hence, in some embodiments, a concentration of the metal alkali hydroxide ranges from 0.2M to 2M or from 0.6M to 2M.

It is noted that while a lower concentration of the metal alkali hydroxide can be utilized, a too low concentration may affect the kinetics of the electrochemical reaction and shift the balance between the electrochemical reaction and the undesired chemically destroying reaction described hereinabove towards the undesired side reaction.

In some embodiments, a concentration of the metal alkali hydroxide ranges from 1M to 2M.

In some embodiments, the concentration of the alkali metal hydroxide is such that the pH of the fuel composition ranges from 6.8 to 14, or from 8 to 14.

If a pH of 8-11 is desired, metal alkali hydroxides such as lithium hydroxide, sodium hydroxide and potassium hydroxide, are typically used.

If a pH of 11-14 is desired, metal alkali hydroxides such as magnesium hydroxide, calcium hydroxide and barium hydroxide, are typically used.

In some embodiments, the fuel cell composition comprises, in addition to, or instead of, the alkali metal hydroxide, an alkali metal sulfate salt such as, for example, sodium sulfate, potassium sulfate, magnesium sulfate, calcium sulfate and barium sulfate.

In some embodiments, a concentration of the fuel in the aqueous solution described herein (anode electrolyte solution; fuel composition) ranges from 0.01M to a saturated solution.

The concentration of the fuel is also determined by the desire to control the balance between the electrochemical reaction and the undesired chemically destroying reaction. At high fuel concentration, the extent of the chemically destroying reaction can be increased.

In some embodiments, the concentration of the fuel in the fuel composition ranges from 0.01M to 3M, from 0.01M to 1M, or from 0.1M to 1M.

The fuel composition in the anode compartment can further comprise surface active agents, in order to prevent or decrease evolution of hydrogen gas and/or gaseous ammonia. The concentration of these agents in the composition can range from 0.001% to 1%, or from 0.001% to 0.1%, or from 0.001% to 0.01% by weight. Exemplary suitable surface active agents include, but are not limited to, tetraalkylammonium compounds and/or aliphatic amines.

In some embodiments, the cathode compartment comprises an acidic aqueous solution, which, together with the peroxide oxidant, forms an oxidant composition.

The aqueous solution comprises an acid, preferably an inorganic acid, at a concentration that ranges from 0.5M to 5M. In some embodiments, the acid concentration is such that the pH of the aqueous solution ranges from 2 to 5, or from 2 to 4, or is being about 3.

In some embodiments, the oxidant composition comprises $HCl$, $H_2SO_4$ or a mixture thereof.

In some embodiments, when the oxidant is a peroxide, a concentration of the peroxide oxidant in the aqueous solution ranges from 0.5% w/v to 25% w/v, or from 0.5% w/v to 20% w/v, or from 0.5% w/v to 10% w/v, or from 0.5% w/v to 5% w/v.

In some embodiments, the oxidant composition further comprises surface active agents that may prevent evolution of oxygen gas (bubbles). A concentration of such agents can be in the ranges of from 0.001% to 1%, or from 0.01% to 1%, by weight.

In some embodiments, the electrolyte aqueous solution in the anode and/or cathode compartments (the fuel cell composition and/or the oxidant composition, respectively) can further comprise an organic solvent. The addition of an organic solvent may be beneficial for preventing or reducing evolution of hydrogen and/or gaseous ammonia (in anode) and/or oxygen (in cathode) as bubbles.

In some embodiments, the content of the organic solvent can be in the range of 1% to 30% by weight, of the total weight of the composition.

Exemplary organic solvents that are suitable for use in this context of the present embodiments include, but are not limited to, dimethylformamide (DMF), ethylene glycol (EG), dimethyl sulfoxide (DMSO) and acetonitrile (AN).

In any of the fuel cells described herein, a separator is interposed between the cathode and anode compartments.

The separator acts as a barrier between the anode and cathode compartment and is typically ion-permeable (ionically conductive) and electron-impermeable (electrically non-conductive). Thus, the separator is typically electron non-conducting and ion-conducting.

The separator can be, and is also referred to herein, as an electrolyte membrane. In some embodiments, the separator is a solid separator, or a solid electrolyte membrane.

In some embodiments, the separator is an alkali anion exchange membrane, which allows the transfer of anions such as $OH^-$, but is impermeable to other anions and to cations such as protons.

Any available alkali anion exchange membrane can be used in the context of these embodiments of the invention, including, as non-limiting examples, carbon-based membranes and nickel-based membranes.

In some embodiments, the solid electrolyte membrane is a Nafion membrane, preferably a Nafion Bilayer membrane such as, for example, Nafion 112, Nafion 115, Nafion 117 and Nafion 119, and any membrane in Nafion series 900-2000.

In some embodiments, the solid electrolyte membrane is a polypropylene membrane (e.g., a polypropylene micropore membrane having a pore diameter smaller than 0.1 μm).

In some embodiments, the solid electrolyte membrane is a polypropylene membrane wetted with a Nafion solution (e.g, from 0.05% to 0.5% by weight Nafion in ethanol).

As demonstrated in the Examples section that follows, the ammonia borane-based fuel cell systems described herein exhibit high efficiency.

In some embodiments, a fuel cell system as described herein exhibits an open circuit potential ($E_{OCP}$) higher than 1.5 Volts, higher than 1.8 Volts and even higher than 2 volts.

In some embodiments, a fuel cell system as described herein exhibits a power output (W) that equals to or is greater than 1 Watt. In some embodiments, the power output is higher than 50 mW/cm$^2$, higher than 60 mW/cm$^2$, higher than 70 mW/cm$^2$, and even higher than 80 mW/cm$^2$. Higher power output values are also contemplated.

In some embodiments, a fuel cell as described herein exhibits a high discharge potential. For example, the fuel cell exhibits a discharge potential that is higher than 0.8 Volt, higher than 0.9 Volt, higher than 1.0 Volt and even higher than 1.1 Volt (e.g., 1.2 Volt), at a current density of 100 mA/cm$^2$. Higher discharge potential values are also contemplated.

In some embodiments, a fuel cell as described herein produces high current. For example, the fuel cell exhibits a current density that is higher than 50 mA/cm$^2$, higher than 60 mA/cm$^2$, and is even 70 mA/cm$^2$ and higher. Higher current density values are also contemplated.

As discussed hereinabove, any of the fuel cell systems described herein utilizes ammonia borane or a derivative, salt, hydrate or solvate thereof, so as to generate electrical power (energy).

Accordingly, according to another aspect of embodiments of the invention there is provided a method of generating electricity, which is effected by electrochemically reacting ammonia borane or a derivative, salt, hydrate or solvate thereof, as a fuel, as described herein, and an oxidant (e.g., a peroxide), as described herein. In some embodiments, the electrochemical reaction is performed in a fuel cell system as described herein.

In some embodiments, the method is effected by supplying a fuel composition, as described herein, to the anode compartment of the system, as described herein, and by supplying an oxidant composition, as described herein, to the cathode compartment of the system, as described herein, and by continuing supplying these components as long as electricity is required, and/or as desired, such that that system operates as a fuel cell.

Supplying the fuel and oxidant compositions to the respective compartments of the fuel cells can be effected by any means known in the art (e.g., via a pump, a pipe, etc.).

In some embodiments, the method is effected by utilizing the system as a battery, such that the fuel is supplied only before use.

According to another aspect of embodiments of the invention there is provided a method of operating a fuel cell, which is effected by contacting an anode compartment of the fuel cell with an anode electrolyte solution that comprises ammonia borane or a derivative, salt, hydrate or solvate thereof, as described herein, as a fuel, and, at the same time, contacting a cathode compartment of the fuel cell with a cathode electrolyte solution which comprises an oxidant, as described herein, and electrochemically reacting the fuel and the oxidant. In some embodiments, the fuel cell is any of the fuel cell systems as described herein Contacting can be effected by placing each of the anode or cathode in the respective composition or by supplying a fuel composition and an oxidant composition, as described herein, to the respective compartment in the fuel cell, as described hereinabove.

While further studying fuel cell systems based on ammonia borane as fuel, the present inventors have surprisingly uncovered that an ammonia borane fuel acts with Au group metals with higher efficiency than with PGM. Without being bound to any particular theory, the present inventors have assumed that this enhanced efficacy may be attributed to the formation of a metal-ammonia complex, which formation is feasible with Au group metals and not with Pt group metals. In further studies, the present inventors have surprisingly uncovered that while utilizing a copper catalyst in the anode, no substantial decrease in the cell efficiency was observed in several cycles, in spite of the use a non-noble metal such as copper, which is prone to oxidation and hence to reduced efficiency. Without being bound to any particular theory, the present inventors have assumed that following its complexation by ammonia, the copper is reduced by the fuel, and hence remains in a non-oxidized state for several cycles of operating the fuel cell.

It has therefore been suggested that a fuel cell that comprises a non-noble metal catalyst can be efficiently operated by selecting a fuel that may reduce any oxidized form of the catalyst, so as to maintain at least a substantial portion of the catalyst unoxidized when the fuel cell is operated.

Hence, according to a further aspect of embodiments of the invention there is provided a fuel cell system comprising an anode compartment, a cathode compartment and a separator interposed between the cathode and the anode compartments, wherein the anode compartment comprises a fuel and a non-noble catalyst layer each selected such that at least a substantial portion of said catalyst layer remains unoxidized when the fuel cell is operated.

By a "substantial portion" it is meant that at least 50%, at least 60%, at least 70% and even at least 80% of the catalyst remains unoxidized upon 5 cycles of operating the fuel cell.

In some embodiments, the non-noble catalyst layer comprises copper or an alloy thereof, as described herein.

A suitable fuel that may reduce any oxidized form of the copper or any other catalyst layer is ammonia borane or a derivative thereof, as described herein.

In some embodiments, the fuel is an ammonia borane and any derivative thereof, as described herein, and the non-noble metal is any metal that can form an ammonia complex.

An "ammonia complex" is used to describe a M(NR$_3$)n complex, wherein M is a non-noble metal, R is hydrogen, alkyl, alkenyl, cycloalkyl, etc., and n is an integer from 1 to 9, depending on the valency of the metal.

As is further discussed herein, the present inventors have designed and successfully prepared and practiced an electrode that comprises copper nanoparticles, as described herein, as a catalyst layer.

Accordingly, according to a further aspect of embodiments of the invention there is provided a fuel cell system comprising an anode compartment, a cathode compartment and a separator interposed between the cathode and the anode compartments, as described herein, wherein at least one of the anode and the cathode comprises a catalyst layer which comprises copper nanoparticles.

Further according to embodiments of the invention there is provided a process of producing an electrode having a catalyst layer that comprises copper nanoparticles. The process is effected by contacting an electrode having a catalyst layer that comprises copper with a solution containing a copper salt and base, to thereby obtain a layer of the copper salt applied onto the electrode; and contacting the electrode having the layer of copper salt applied thereon with phosphinic acid or a salt thereof, thereby producing the electrode.

The present inventors have utilized a known process of producing copper nanoparticles, for generating copper nanoparticles onto a copper electrode.

A copper-containing electrode onto which copper nanoparticles are generated can be any commercially available or laboratory-prepared electrode, and can be in a form of, for example, a plate, a rod or a mesh.

In some embodiments, the electrode is a mesh electrode, as described herein. The solution used for forming a copper salt on the electrode is preferably an aqueous solution. Exemplary copper salts include, but are not limited to, copper sulfate, copper chloride and copper acetate.

In some embodiments, the aqueous solution comprises ammonia as base. However, other based are also contemplated. KOH is one, non-limiting, example.

In some embodiments, contacting the electrode with the copper salt solution is effected while heating the electrode soaked with the solution. Heating may be effected at 50-80° C.

In some embodiments, contacting the electrode having the copper salt deposited thereon with phosphinic acid is effected by heating. Heating may be effected at 50-80° C.

The phosphinic acid or a salt thereof is used for reducing the copper salt while generating copper nanoparticles. An exemplary salt is $NaH_2PO_2$. Other salts, as well as other compatible reducing agents are contemplated.

Further details concerning the process described herein are provided in Example 2 in the Examples section that follows.

The electrode containing a catalyst layer that comprises copper nanoparticles, as described herein, can be used in constructing a membrane-electrodes-assembly (MEA), for purposes other than fuel cells.

Any of the fuel cell systems described herein can be used in many applications. Generally, the fuel cell can be incorporated in any electrically driven or hybrid electric (namely, driven by electrical and at least one additional form of energy) system or device, or can be in electrical communication with the system or device for operating it. Systems and devices incorporating the fuel cell as described herein can be stationary or movable, portable or non-portable. In some embodiments, the fuel cell system is incorporated in a power source which is adapted to power the electrically driven system or device. The size, shape and output of the fuel cell is preferably adapted to the application which consumes its energy.

Herein, the phrase "electrically driven system or device" and "electricity consuming system or device" are used interchangeably.

One type of application which can incorporate the fuel cell or portable power source according to some embodiments of the present invention is an electronic device. Representative examples of such device, include, without limitation, a portable telephone, a personal computer, a notebook computer, a portable charging dock, a pager, a PDA, a digital camera, a gameplayer, a smoke detector, a hearing aid, a portable TV, night vision goggles, a portable GPS device, a portable lighting device, a toy, a computer peripheral device, an household appliance, a cordless household appliance, an industrial product, a mobile equipment, a robot, a cordless tool (e.g., drill, saw).

Another type of application which can incorporate the fuel cell or portable power source according to some embodiments of the present invention is an electrically driven or hybrid electric vehicle. One example of a vehicle suitable for the present embodiments is an automobile such as, but not limited to, a car, a bus, a forklift, a segway, a motorcycle, a mobility scooter, a two- three- or four-wheel scooter, a saddle-ride type vehicle. Another example is an unmanned utility vehicle, such as, but not limited to, an autonomous lawn mower, an autonomous pool cleaner and the like. An additional example is an elevated altitude manned or unmanned vehicle, such as, but not limited to, an aircraft, a high altitude aircraft, a rocket and a spacecraft. A further example is a manned or unmanned underwater or above-water vehicle.

The fuel cell described herein can also be incorporated in distributed power source such as, but not limited to, a cogeneration system or a stationary power plant for a house, a public structure an industrial facility. Also contemplated are various appliances typical used in emergency situations, including, without limitation, emergency kits, emergency power supplies, emergency lights, backup generators and the like.

The fuel cell systems presented herein can be further used as a component in a power source in a location, such as, but not limited to, spacecraft, weather station, park, rural location and the like. A fuel cell system according to some embodiments of the present invention can be compact and lightweight.

The fuel cell systems presented herein can be further used in combined heat and power systems. The fuel cell systems of the present embodiments can be used to generate electric power, and at the same time produce hot air and water from the waste heat.

In some embodiments, the fuel cell systems described herein are utilized in a method for powering an electrically-driven or electricity-consuming system or device, as described herein. The powering is effected by establishing electrical communication (e.g., connecting) between the fuel cell system and the electricity-consuming system or device.

As used herein, the phrases "fuel cell", "fuel cell device" and "fuel cell system" are used interchangeably.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" or "process" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

An Ammonia Borane-Based Fuel Cell Having an Anode Containing a Catalyst Layer of Gold, Silver or Copper As discussed hereinabove, most of the current methodologies for constructing borohyride-based and ammonia borane-based fuel cells utilize Pt or Pt group metals (PGM) as catalysts for hydrogen generation. The disadvantages of using noble metals, and PGM in particular, as catalysts are delineated supra. Hence, according to fuel cell demands, a catalyst with improved performance, as compared with Pt (or Pt group metals) is required; less active in regular storage regimes and more active in the active discharge regime.

While searching for such a catalyst, the present inventors have found out, by serendipity, that a Cu (copper) catalyst is highly beneficial for generating hydrogen in a ammonia-borane based fuel cell.

Materials and Experimental Methods

Electrochemical measurements were performed in a standard three-electrode cell containing the catalyst (a metal electrode) as the working electrode (0.5-1.6 cm$^2$ geometric area), a counter glassy carbon (GC) electrode (d=2 mm), and an Ag/AgCl, saturated KCl, as a reference electrode. The electrochemical experiments were conducted using PC-controlled (Autolab GPES software) Autolab potentiosta/galvanostat (Autolab type III).

Fuel cell measurements were performed in a galvanostatic regime, by applying varying successive current: 0 A for 60 seconds, 0.2 A for 200 seconds, 0.5 A for 3,000 seconds and 0.7 A for 30,000 seconds.

All metals were purchased from "Holand Morane", at 99.9% purity, unless otherwise indicated. The following electrodes were used:

Cu electrode (0.5 cm$^2$)

Au electrode (0.5 cm$^2$)

Ag electrode (0.5 cm$^2$)

Ir, Pd, Fe, Co and Ni electrodes, at the indicated geometrical area

Counter glassy carbon (GC) electrode (d=2 mm)

Cu mesh electrode (1.6 cm$^2$, unless otherwise indicated) 99.5%, 50-100 μm each wire Au electrode (1.6 cm$^2$)

E-TEK (Pt) electrode (1.6 cm$^2$)

Ru electrode (1.6 cm$^2$)

Results

OCP Measurements:

Since $E_{OCP}$ is an important parameter for determining the suitability of an electrode material in fuel cells, $E_{OCP}$ measurements were first performed.

Three catalyst groups were tested: Pt and Pt group metals (group 1), Au and Au group's metals (group 2) and also Fe, Co, Ni group (group 3). Table 1 presents the OCP measurements (vs. Ag/AgCl, sat KCl), using various concentrations of AB ($C_{AB}$; 0.1-1.2M), in a 1M NaOH background solution.

TABLE 1

| $C_{AB}$ | Group 1 | | | | Group 2 | | | Group 3 | | |
|---|---|---|---|---|---|---|---|---|---|---|
| [M] | Pt | Pd | Ir | Ru | Au | Ag | Cu | Fe | Ni | Co |
| 0.1 | −0.99 | −0.98 | −0.98 | −1.09 | −1.18 | −1.27 | −1.36 | —* | −1.02 | −1.02 |
|  | −0.96 |  | −0.95 |  |  | −1.23 |  |  |  |  |
| 0.5 | −1.02 | −1.0 | −0.92 | −1.09 | −1.16 | −1.25 | −1.42 | — | −1.05 | −1.03 |
| 1.0 | −1.05 | −1.02 | — | −1.11 | −1.21 | −1.31 | −1.40 | — | −1.07 | −0.99 |
| 1.2 | −1.05 | −1.03 | — | −1.12 | −1.19 | −1.29 | −1.42 | — | −1.06 | −1.0 |

*OCP Fe not stable

As shown in Table 1, metals of Group 2 (Au group) exhibited the most negative $E_{OCP}$ in the ammonia borane system, while the Cu/AB system surprisingly produced the most negative $E_{OCP}$ compared to all other metal catalysts.

AB Electro-Oxidation on Au, Ag and Cu Electrodes:

Three different electrodes: Au, Ag and Cu plates (0.5 cm$^2$) were used as catalysts for the electro-oxidation process of ammonia-borane. The electro-oxidation process of ammonia-borane was inspected in different concentrations of ammonia-borane (up to 0.4M) and in different concentration of alkali solution (up to 1.2M NaOH).

The electrochemical measurements were performed by applying a sweep potential, scan rate 50 mV·s$^{-1}$, using Ag/AgCl, KCl saturated, as reference electrode.

Figure 2A:
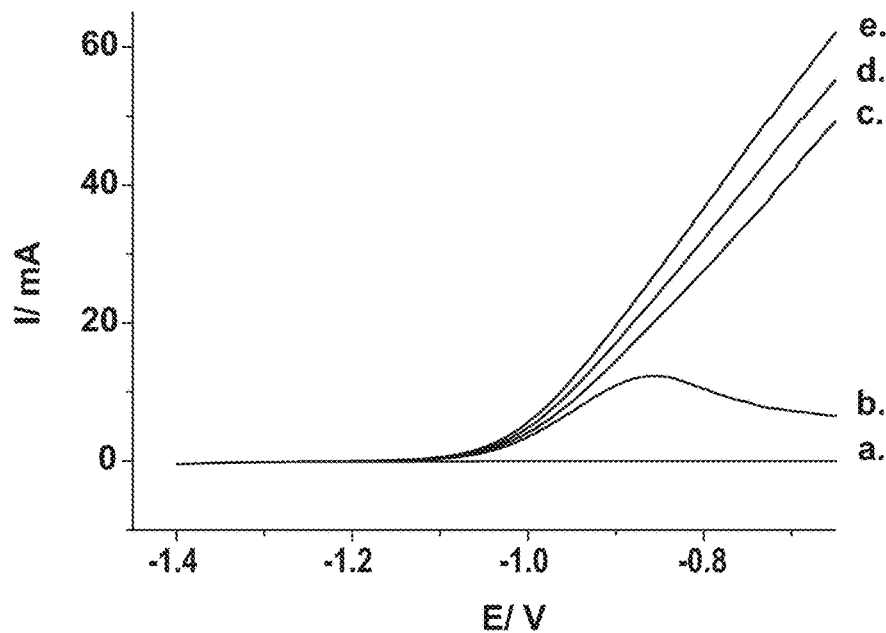
FIGS. 2A-C show the electro-oxidation process of ammonia-borane, in 1.2M NaOH solution, upon applying a sweep potential, scan rate 50 mv·s$^{-1}$, using Ag/AgCl, KCl saturated, as reference electrode, and Au electrode (FIG. 2A), Ag electrode (FIG. 2B), and Cu electrode (FIG. 2C), in the absence of ammonia-borane (a), and in the presence of 0.1M (b), 0.2M (c) 0.3M (d) and 0.4M (e) ammonia-borane.
Figure 2B:
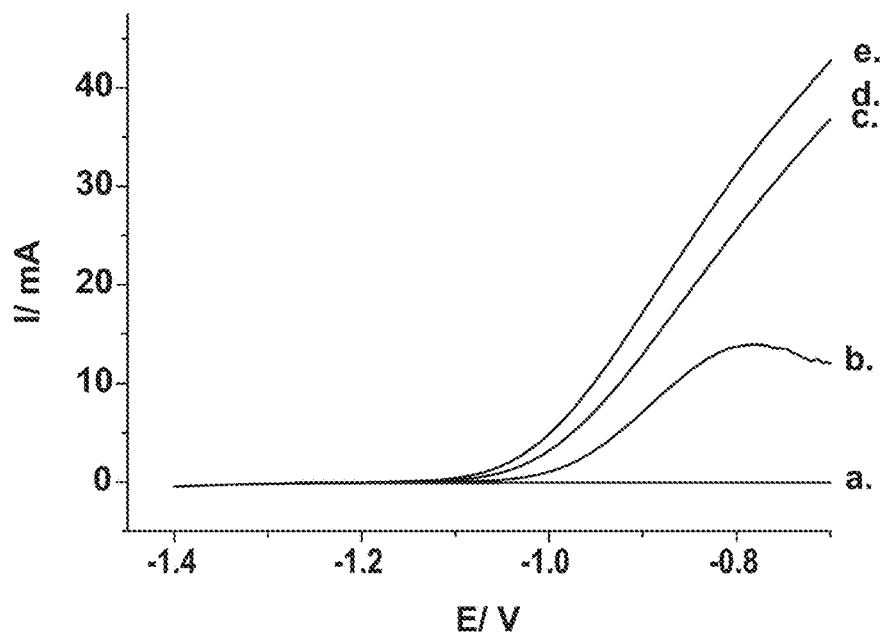
Figure 2C:
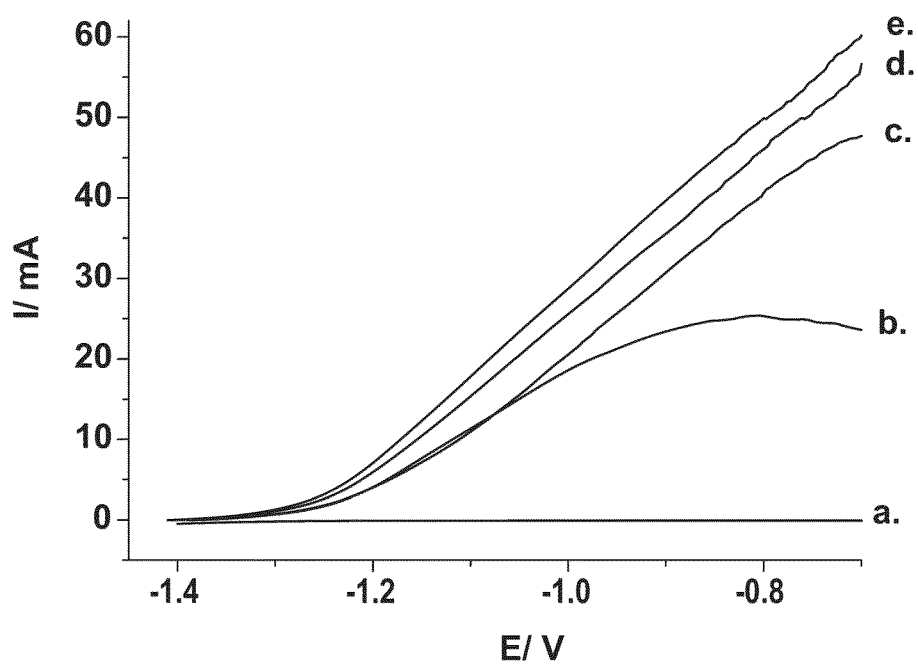

FIGS. 2A-C present the electro-oxidation process of ammonia-borane in the presence of an Au catalyst (FIG. 2A), an Ag catalyst (FIG. 2B) and a Cu catalyst (FIG. 2C) in a 1.2M NaOH alkali solution, at different concentrations of ammonia-borane (up to 0.4M).

As shown in FIGS. 2A-C, while all electrodes showed catalytic activity for the electro-oxidation of AB, the oxidation current in the presence of a Cu catalyst appears in a more negative potential (about −1.35 V) compared to the Ag and Au catalysts (about −1.05 V).

Figure 2D:
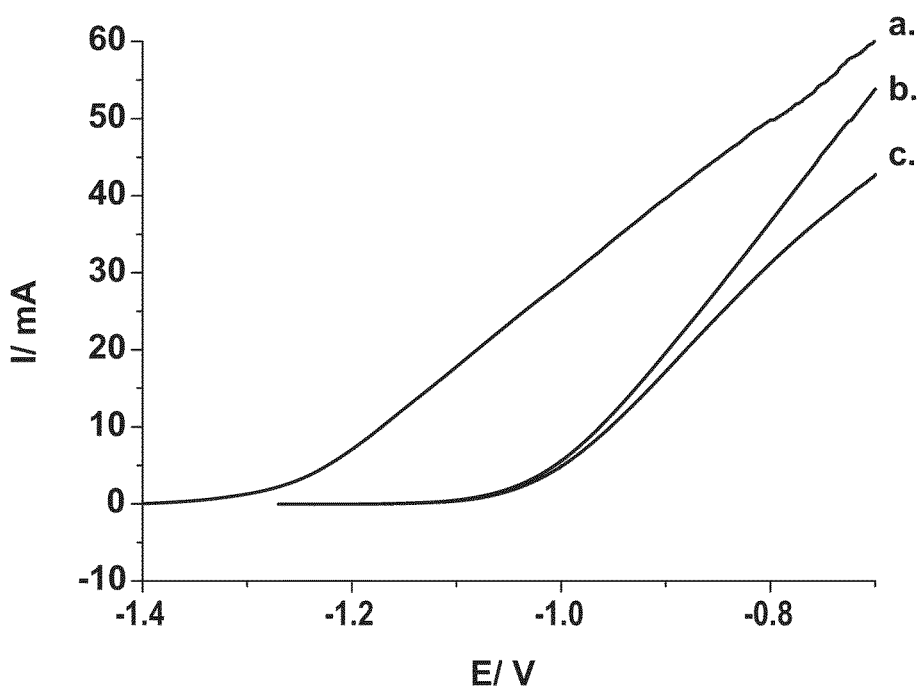
FIG. 2D shows maximum current curves, at ammonia-borane concentration of 0.4M, for a Cu electrode (a), an Au electrode (b) and an Ag electrode (c).

FIG. 2D presents the maximum current curve of each catalyst at an ammonia-borane concentration of 0.4M. A Cu catalytic activity which is about 6 times higher than that of Au and Ag (at E=−1.00 V) was observed.

Electro-Oxidation of AB on Cu Electrode (Fuel/Catalyst System):

The electro-oxidation process of Cu/AB was further investigated, using a Cu mesh electrode (1.6 cm$^2$) in various concentrations of AB (0.0-160 mM) and a NaOH concentration of 0.6M.

Figure 3:
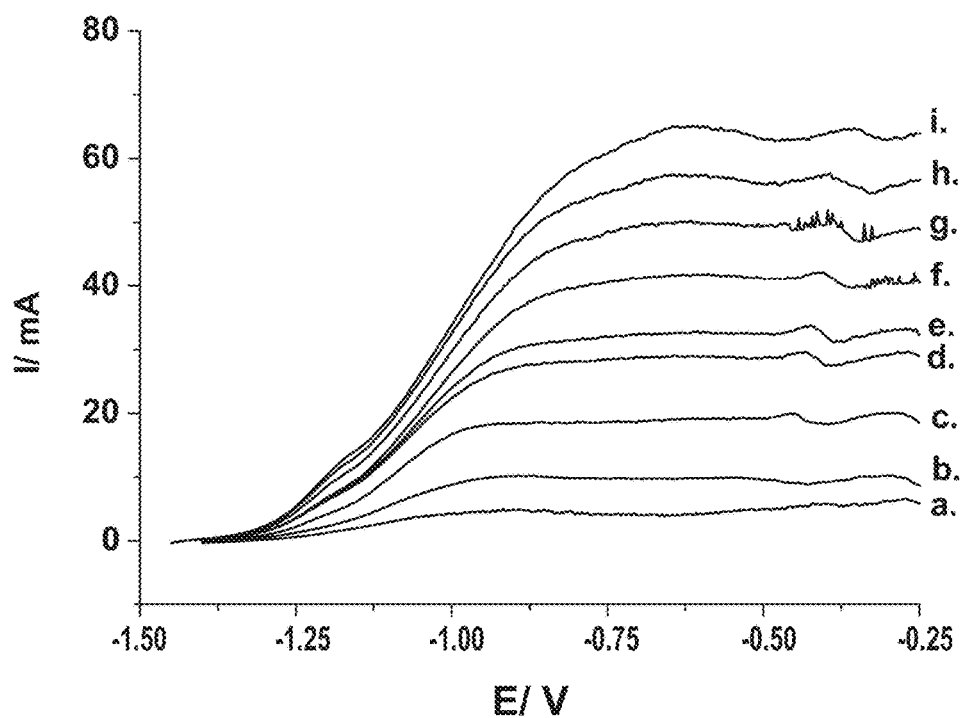
FIG. 3 shows the electro-oxidation process using Cu mesh electrode (1.6 cm$^2$) in ammonia-borane concentration of 0M (a), 20 mM (b), 40 mM (c), 60 mM (d), 80 mM (e), 100 mM (f), 120 mM (g), 140 mM (h) and 160 mM (i), in 0.6M NaOH solution, as obtained in experiments performed according to various exemplary embodiments of the present invention.

FIG. 3 shows the electro-oxidation process using the Cu mesh electrode with the following concentration of AB: 0M (curve a), 20 mM (curve b), 40 mM (curve c), 60 mM (curve d), 80 mM (curve e), 100 mM (curve f), 120 mM (curve g), 140 mM (curve h) and 160 mM (curve i).

The electrochemical measurements were performed by applying a sweep potential, scan rate 50 mV·s$^{-1}$, using Ag/AgCl, KCl saturated, as a reference electrode.

Figure 4:
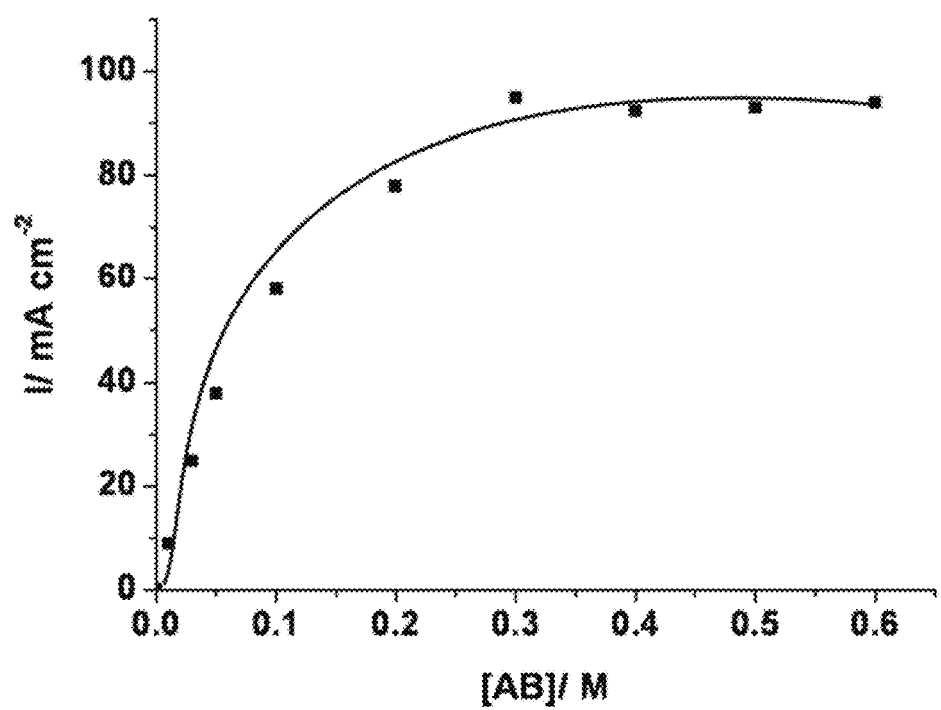
FIG. 4 is a calibration curve defined from the electro-oxidation measurements presented in FIG. 3, derived at E=−1.00V.

FIG. 4 presents the calibration curve derived from the electrochemical measurements presented in FIG. 3 at E=−1.00 V. The current increases linearly up to a concentration of about 0.3M. At higher concentrations, the current remains steady, being about 90 mA.

These data suggest that an AB oxidation anode reaction on a Cu electrode is diffusion limited. Diffusion current plate is wide (from 500 mV at 20 mM to 200 mV at 160 Mm). Without being bound to any particular theory, it is suggested that there is an ion transport limitation, and therefore, that an electron transfer is not a limiting step of the described electrochemical reaction.

Thus, the fuel cell system of the present embodiments exhibits fast kinetic and high current level.

System Parameters Optimization:

As discussed hereinabove, high NaOH concentrations of the background electrolyte pose a risk for users and exhibit corrosive properties of the fuel compartment solution. It is therefore desired to decrease the NaOH concentration of the background electrolyte.

To this end, the minimal NaOH concentration that can be used in the described system without affecting its utility was determined.

Figure 5:
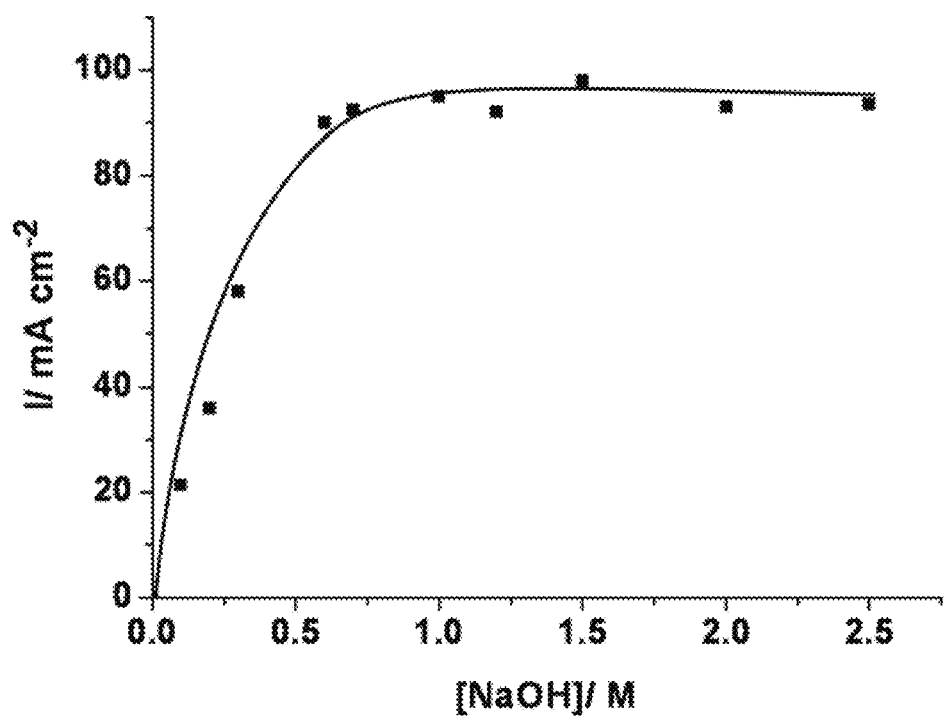
FIG. 5 is a plot presenting the oxidation current vs. NaOH concentration as obtained in experiments performed according to various exemplary embodiments of the present invention, at ammonia-borane concentration of 0.4M, and E=−1.00 V, using a Cu mesh electrode (1.6 cm$^2$).

FIG. 5 presents the oxidation current vs. NaOH concentration (0.01-2.5M) at constant concentration of AB, 0.4M, and at E=−1.00 V, using Cu mesh electrode (1.6 cm$^2$). The electrochemical measurements were performed as in previous experiments.

The results show that the NaOH concentration can be reduced down to 0.6M. This value is about 3.5 times lower than those previously reported for ammonia-borane based fuel systems (see, Xu et al., and Zhang et al., supra). This value is about ten times lower than many other borohydride fuel cells.

The experimental results therefore show that an AB/Cu mesh system, according to embodiments of the invention, is characterized by a high $E_{OCP}$ value and high catalytic activity for AB oxidation.

Electrochemical Behavior of a Cu Catalyst in AB and NaBH$_4$ Solutions:

For further understanding, the electro-oxidation process of NH$_3$—BH$_3$ was compared to those observed for NaBH$_4$ using various catalysts: Cu, Au, E-TEK (Pt) and Ru (1.6 cm$^2$, all electrodes).

Figure 6A:
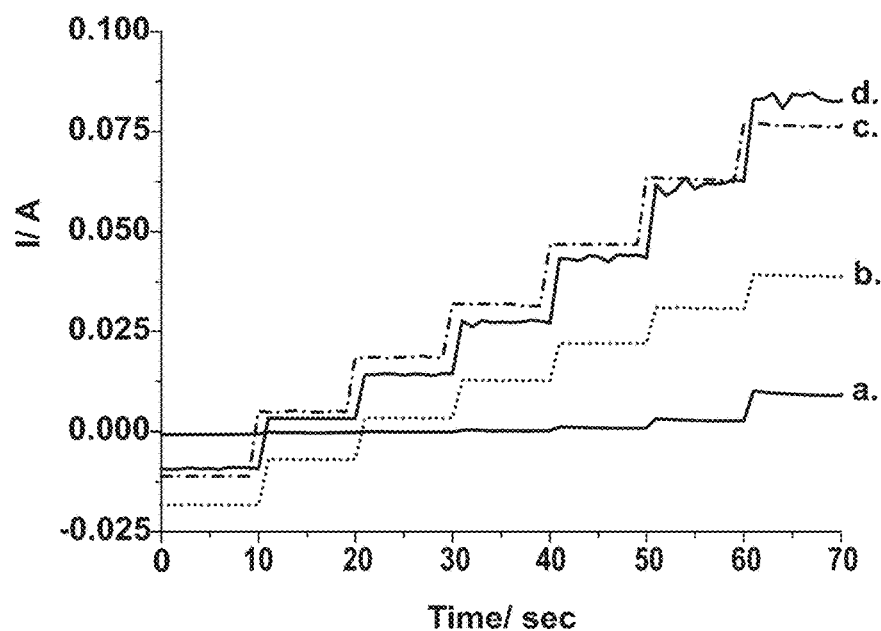
FIGS. 6A-C present oxidation current responses for the different catalysts as obtained in experiments performed according to various exemplary embodiments of the present invention.
Figure 6B:
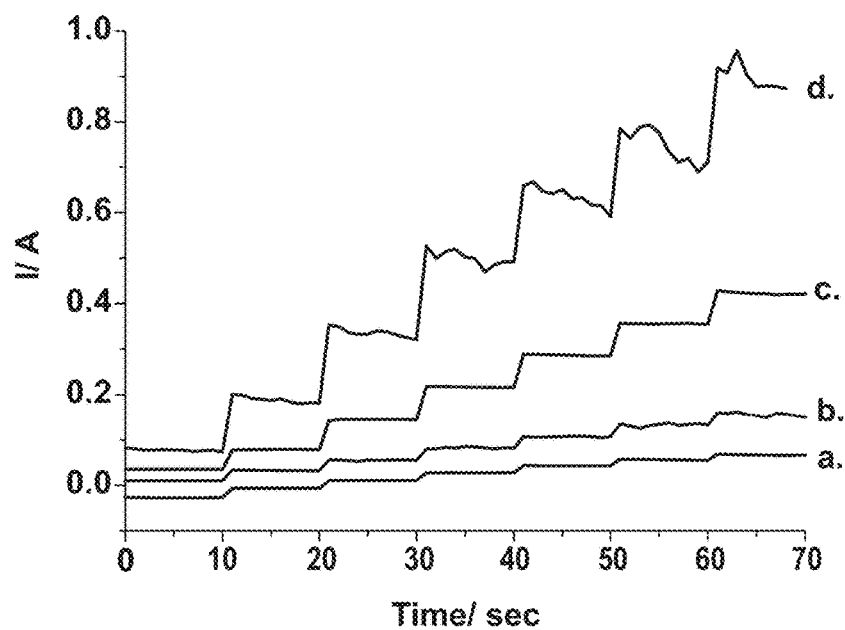
Figure 6C:
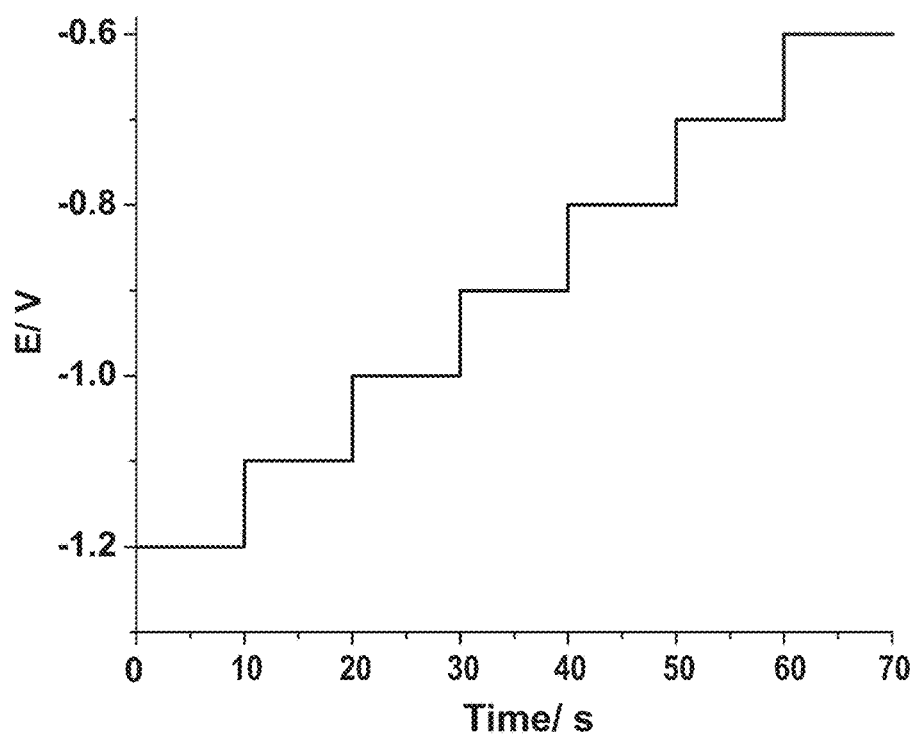

FIGS. 6A and 6B present the oxidation current responses for the different catalysts; Cu, Au, E-TEK and Ru with 0.4M sodium borohydride (FIG. 6A) and 0.4M ammonia-borane (FIG. 6B). The lines a, b, c and d correspond to Ru, E-TEK (containing about 4 mg·cm$^{-2}$ Pt), Au and Cu, respectively. FIG. 6C presents the potential applied vs. time for all experiments.

These data surprisingly demonstrate that Ru is a suitable catalyst for the electro-oxidation of sodium borohydride and a less suitable catalyst for ammonia-borane. Cu is a suitable catalyst for the electro-oxidation of ammonia-borane and a less suitable catalyst for sodium borohydride. The oxidation current in the presence of ammonia-borane using Cu catalyst is about 9 times higher than using E-TEK and Ru catalysts and about 1.6 higher than Au catalyst.

In summary of the data presented thus far, it is shown that the $E_{OCP}$ of Au group metals in AB alkali solutions is more negative compared to the $E_{OCP}$ of Pt group metals (about −1.0 V for Pt group metals compared to about −1.2 V for Au group metals). The $E_{OCP}$ of Ag/AB system is about −1.3 V and the $E_{OCP}$ of Cu/AB system is about −1.4 V, which is 1.4 times more negative than the $E_{OCP}$ of Pt/AB.

It is further shown that the AB oxidation current (at over-potential of about 220 mV) on a Cu electrode is about 25 mA/cm$^2$, whereby under the same conditions no oxidation current is observed when a Pt electrode is used.

It has further been shown that the Pt group metals are more efficient in sodium borohydride systems than Cu, in terms of $E_{OCP}$, whereby the Au group metals are much more efficient in ammonia borane systems, with Cu being the most efficient.

Without being bound to any particular theory, it is suggested that the different performance between Pt group metals and Au group metals in ammonia borane systems results from the formation of a complex of the Au, Ag and Cu metals with $NH_3$ group, which does not occur with Pt group metals.

It can therefore be suggested that the high $E_{OCP}$ exhibited by the $Cu/NH_3BH_3$ system results from a process that involves oxidation of copper in alkali solutions, to thereby form CuO on the Cu surface, which is followed by reduction of Cu (in the formed CuO) by AB, which is a strong reducing agent, back to Cu, as is further detailed hereinbelow. It is further suggested that when a potential is applied, the bond $NH_3$—$BH_3$ is cleaved; $BH_3$ reacts with Cu to produce 6 electrons; and $NH_3$ reacts with the oxidized Cu on the Cu surface to produce the ammonium complex $[Cu(NH_3)n]^{n+}$.

Full Cell Parameters:

Direct measurements of $E_{OCP}$ were performed in a complete fuel cell system, composed of an anode compartment which contains a Cu electrode, having a geometric area of 0.8 cm$^2$, and a basic aqueous solution of ammonia-borane; a cathode compartment which contains an Ag electrode, in the form of Ag electro-coated on Ni mesh, and an acidic aqueous solution of hydrogen peroxide; and a polypropylene micro-pore membrane (pore diameter <0.1 µm).

Cu(A=0.8 cm$^2$)/AB∥H$_2$O$_2$/Ag/Ni, polypropylene micro-pore membrane (pore diameter <0.1 µm).

The system is presented as:

Cu-mesh//0.1M $NH_3$ $BH_3$+0.6M NaOH+1 mM KCl∥$10^{-3}$M $H_2SO_4$+1M $Na_2SO_4$+0.5M $H_2O_2$// Ag/Ni.

A series of measurements yield a value of $E_{OCP}$=−1.83±0.05 V.

The difference between $E_{OCP}$ experimental and $E_{OCP}$ calculated is less than 0.2 V.

Figure 7:
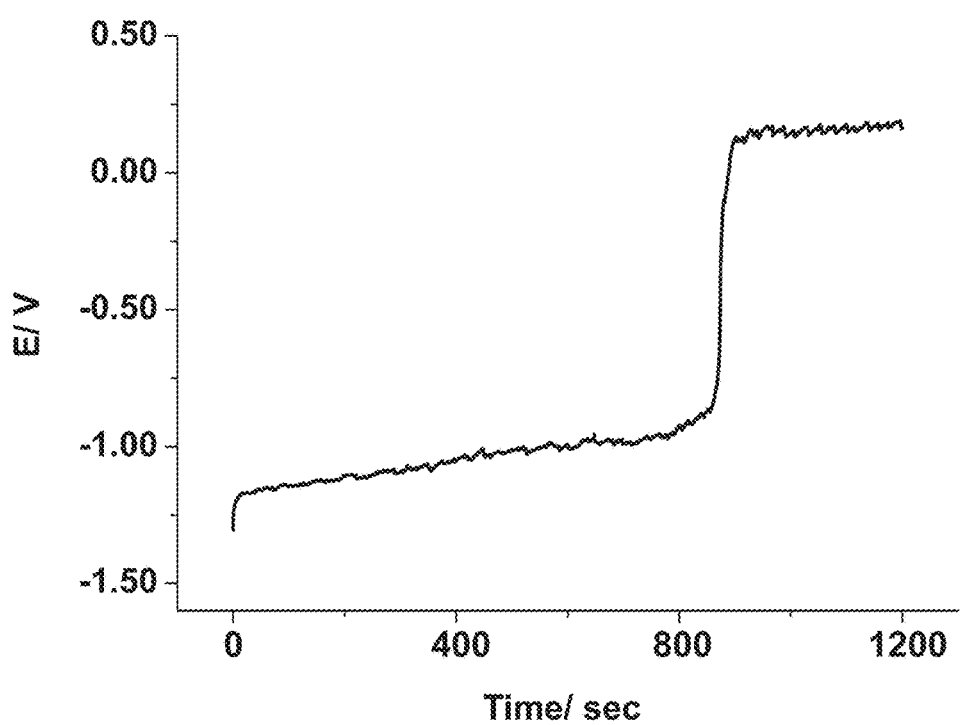
FIG. 7 presents a discharge potential curve as obtained in experiments performed according to various exemplary embodiments of the present invention.

Discharge measurements of the fuel cell of the present embodiments are presented in FIG. 7, which shows the discharge potential curve (current density is 60 mA/cm$^2$). The potential drops from about −1.00 V (in the presence of fuel) to about +0.2 V (fuel in consumed).

Safety Parameters:

As discussed hereinabove, a concentration of 0.6M NaOH background in the anode compartment is sufficient for exhibiting the desired performance. The concentration of $H_2SO_4$ in the cathode compartment is as low as 0.001M. Because [NaOH]>>[$H_2SO_4$], when the electrolytes are mixed, the pH of the cell is practically stable, thus allowing various possibilities for constructing the cell, without the safety limitations posed by undesired interactions of the electrolytes (e.g., as in the case of a high concentration of both the acid and case solutions).

It is noted that when Pt group metals are used as catalysts in fuel cell systems, highly basic solutions must be used, since otherwise the Pt is highly unstable, as discussed hereinabove. Further in various fuel cell systems, including ammonia borane systems, both highly basic (in the anode compartment) and highly acidic (in the cathode compartment) solutions are used, rendering the cells prone to hazardous reactions in cases of membrane leakage.

Performances of the Fuel Cell System:

The fuel cell described herein was compared with the fuel cells disclosed in Zhung, Xu-1 and Xu-2 (supra). The comparison is presented in Table 2 and shows the advantages of the fuel cell described herein (generally denoted as CuAB/alkali solution/∥/pH-5 acidic solution/$H_2O_2$/Ag).

TABLE 2

| Entry | component or parameter | the present embodiment | Xu-1 | Xu-2 | Zhung |
|---|---|---|---|---|---|
| 1 | Fuel | AB | AB | AB | AB |
| 2 | Anode catalyst | Cu-nano | Pt | Pt | Ag |
| 3 | Anode background | 0.6-4.4 M NaOH | 6 M NaOH | 2 M NaOH | 2-6 M NaOH |
| 4 | oxidant | $H_2O_2$—water | $O_2$—air | $O_2$—air | $O_2$—air |
| 5 | Cathode catalyst | Ferrocene and Prussian blue (based on $Fe^{+2}/Fe^{+3}$ system) | Pt | Pt | $MnO_2$ |
| 6 | Cathode background | pH 3 to <pH 0 | | | |
| 7 | separator | Nafion 117 and/or polypropylene | Nafion+ | Nafion (−) | Nafion+ |
| 8 | $H_2$ ↑ bubbles | Utilization of modest $H_2$ ↑ in hybrid machine | Depression $H_2$ - add 1 mM TU | $H_2$ ↑ bubbles | $MnO_2$ cathode I --> min |

| | Cell parameters | the present embodiment | Xu-1 | Xu-2 | Zhung |
|---|---|---|---|---|---|
| 9 | $E_{OCP}$ | −1.8-2.0 V | −1.15 V | −1.15 V | −1.15 V |
| 10 | Discharge potential | 1.0 V (I = 100 mA/cm$^2$) | 0.5 V (I = 24 mA/cm$^2$) | 0.5 V (I = 75 mA/cm$^2$ at 25 C.°) | 0.4 V (I = 10 mA/cm$^2$) |

TABLE 2-continued

| 11 | Discharge current density (mA/cm²) | 100 mA/cm² (at 1 V) | 24 (at 0.5 V) | 75 (at 0.5 V) | 10 (at 0.4 V) |
|---|---|---|---|---|---|
| 12 | Operation t, ° C. | RT | RT | 20-45 | RT |
| 13 | Additional equipment | Not required | 2 pumps* | 2 pumps* | 2 pumps* |
| 14 | Power (W) | 100 mW/cm² | 12 mW/cm² | 37 mW/cm² | 4 mW/cm² |

*W pump >> W cell

Example 2

An Ammonia Borane-Based Fuel Cell with an Anode Containing Copper Mesh and Copper Nanoparticles as a Catalyst Layer The present inventors have further practiced a fuel cell which contains ammonia-borane (AB) as fuel and $H_2O_2$ as oxidant, with a Cu-nano catalyst (mesh and nanostructure) for electro-oxidation of AB.

Materials and Experimental Methods

Cu nanoparticles-containing electrodes were prepared according to the procedure described by [Jian-guang et al., Trans. Nonfer. Met. Soc. China, 2007, 12, s1181], as follows: a conventional Cu-mesh electrode, as described hereinabove, was soaked in a solution (3 ml) containing 0.2M $CuSO_4$ and 0.8M ammonia for 30 minutes and heated to 65° C. 0.3M $NaH_2PO_2$ (as a reducing agent, 3 ml) was thereafter added to the Cu mesh electrode-containing mixture, and after additional 3 hours at 65° C., the obtained Cu electrode was washed with purified triple distilled water (Ultrapure water (resistivity of 18MΩ) from EasyPure RF (Barnstead) source was used throughout all the experiments), and ethanol and was kept in acetonitrile until used.

Electrochemical measurements were performed as described in Example 1 hereinabove.

Anode discharge efficiency measurements were preformed in different galvanostatic regime. The efficiency of the process was calculated according to the following equation:

$$\eta = Q_d \cdot Q_t^{-1} \cdot 100\%$$

wherein η is the efficiency (reported in %), $Q_t$ is the theoretical calculated charge (Coulomb) (corresponding to the amount of AB) and $Q_d$ is the real charge derived from the discharge curves (when a sharp increase of voltage was absorbed).

Full cell measurements were performed by a home-made PVDF electrochemical cell, Nafion 117 was used as a separating membrane, and the distance between the two electrodes was about 0.2 cm. The surface area of the anode corresponds to 10 cm² and of the cathode to 20 cm².

SEM measurements were conducted using a Jeol, JSM-6700F, electronic microscope.

Anode and Cathode System Parameters

Cu nanoparticles-containing electrode was fabricated in order to increase the current density of the fuel cell system.

A Cu nanoparticles-containing structure was fabricated as described hereinabove, by performing a Cu nanoparticles synthesis in the presence of a conventional Cu-mesh electrode. During this process Cu nanoparticles were formed and attached to the conventional Cu-mesh electrode.

Figure 8A:
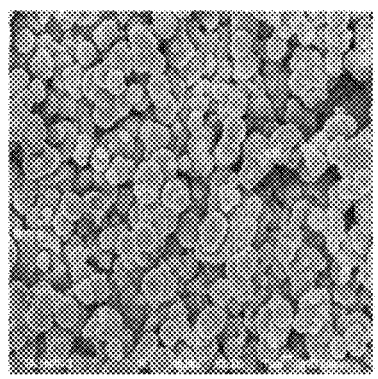
FIGS. 8A-D presents SEM images of a Cu nanoparticles-containing electrode (FIGS. 8A and 8B) and a conventional Cu mesh electrode (FIGS. 8C and 8D), according to various embodiments of the invention.
Figure 8C:
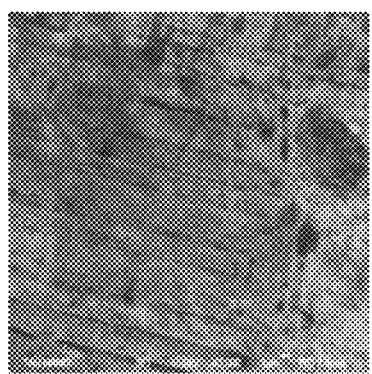
Figure 8B:
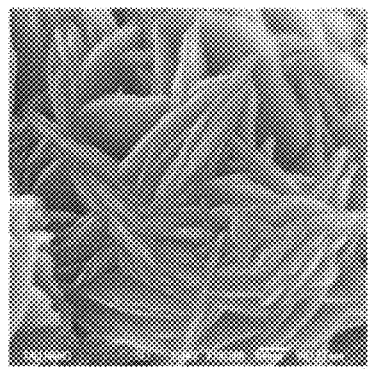
Figure 8D:
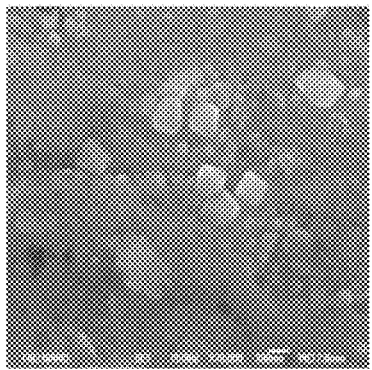

FIGS. 8A-D present SEM images of the Cu nanoparticles-containing electrodes (FIGS. 8A and 8B) and of conventional Cu mesh electrodes (FIGS. 8C and 8D).

As shown in FIGS. 8A-D, the Cu nano-structure electrode consists of microspherical Cu elements and is also characterized by nano roughness, while the conventional Cu mesh electrode is characterized by a smooth surface.

The electro-oxidation process of AB using Cu nanoparticles-containing electrode was compared to conventional Cu mesh electrode, and was further compared to the electro-oxidation process using "E-TEK" electrode (Pt/Vulcan on Ni-mesh, Pt: about 4 mg/cm²).

Figure 9:
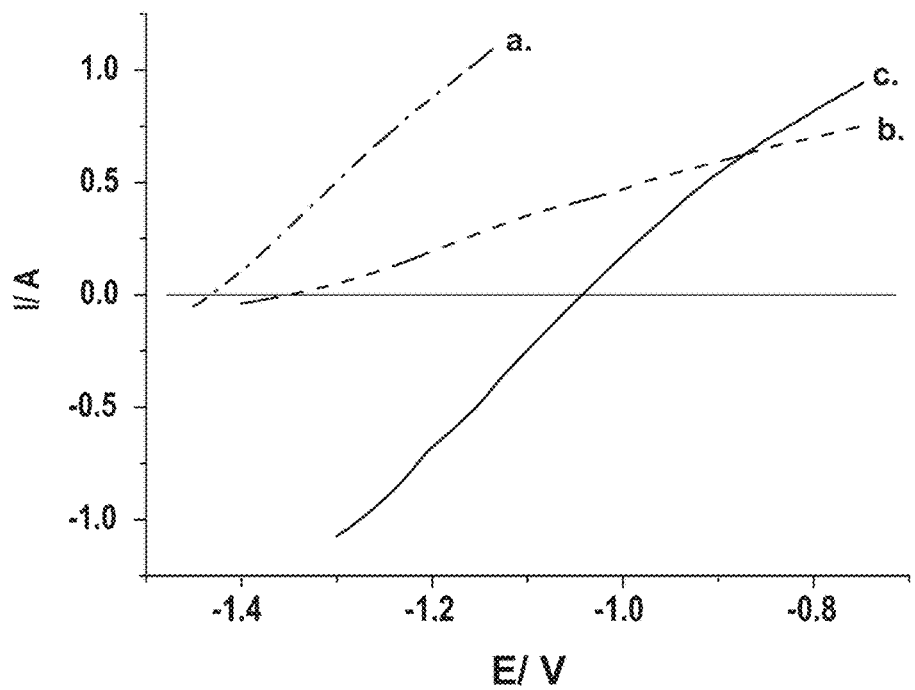
FIG. 9 presents comparative plots showing the electro-oxidation process of ammonia-borane using a Cu nanoparticles-containing electrode (curve a), a conventional Cu mesh electrode (curve b) and an E-TEK (PT catalyst) commercial electrode (curve c), each having a geometrical area of 14 cm$^2$. The electrochemical measurements were performed by applying a sweep potential, scan rate 50 mv·s$^{-1}$, using Ag/AgCl, KCl saturated, as reference electrode.

FIG. 9 presents the electro-oxidation process of ammonia-borane in the presence of the Cu nanoparticles-containing electrode (curve a), a Cu mesh electrode (curve b) and the "E-TEK" (Pt catalyst) commercial electrode (curve c), and shows that the highest current is achieved by the Cu nanoparticles-containing electrode (curve a).

It is further shown in FIG. 9 that the oxidation process using both Cu electrodes (curves a and b) appears at a potential of about 350 mV lower compared to the commercial "E-TEK" electrode (curve c), and that the electro-oxidation process using the Cu nanoparticles-containing structure electrode occurs at a potential of about 80 mV lower compared to the conventional Cu mesh electrode.

Thus, it is shown that the Cu nanoparticles-containing electrode produces two important characteristics: an increased catalytic oxidation current, as compared to Pt electrode and an additional nano catalytic effect, which is reflected by the appearance of oxidation current at a lower potential (for instance, at E=−1.2 V, Cu nanoparticles-containing electrode produces about 1 A, Cu mesh electrode produces about 0.2 A and Pt electrode produces 0.0 A).

The feasibility of the Cu electrodes was examined in different discharge regimes, from 0.1 A (7.1 mA·cm⁻²) to 1 A (71 mA·cm⁻²), using a conventional Cu mesh electrode.

The first cycle was performed in 1.6% w/v AB (0.5M) in 3M NaOH, 20 ml solution. After the AB was consumed during the electrochemical process (a sharp increase of voltage was absorbed), 1% w/v of AB (0.3M) was added in-situ 6 times (from concentrated AB solution, 3M, NaOH). Ag/AgCl, KCl sat, was used as reference electrode.

The anode discharge efficiency, examined in a galvanostatic regime up to 0.4 A (28 mA·cm⁻²), produced discharge efficiency of about 50% after two cycles consuming 1% w/v of AB (0.3M).

Figure 10A:
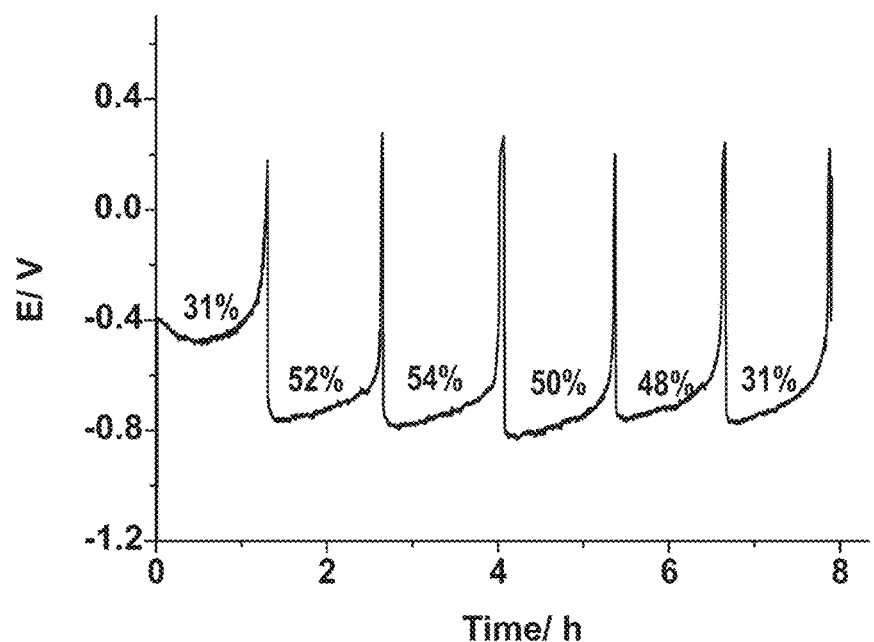
FIGS. 10A-B demonstrate the stability of a Cu-mesh electrode (14 cm$^2$) according to various embodiments of the invention in current regimes of 0.5 A (36 mA·cm$^{-2}$) (FIG. 10A) and 1 A (71 mA·cm$^{-2}$) (FIG. 10B). The numbers above represent the efficiency (η). Ag/AgCl, KCl saturated, was used as reference electrode.
Figure 10B:
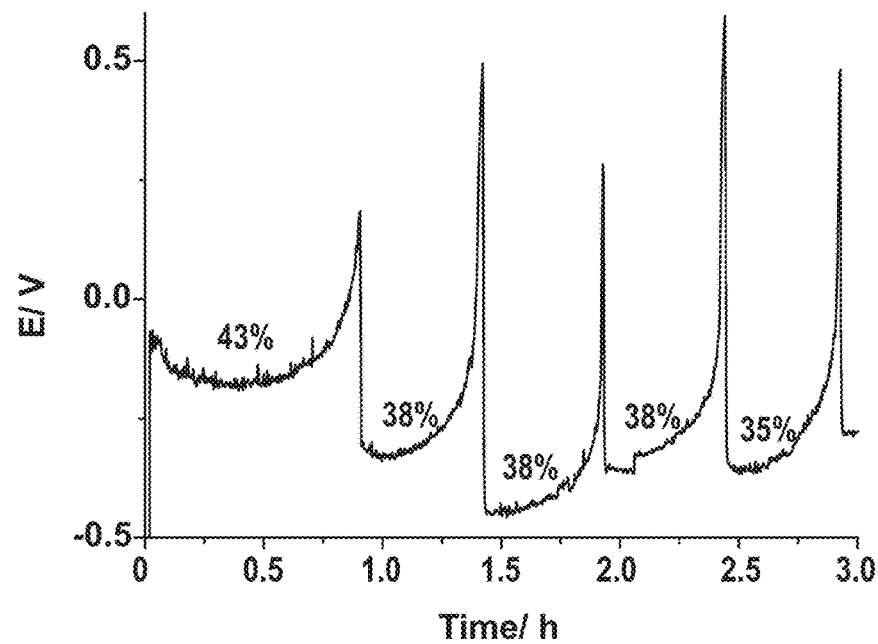

FIGS. 10A and 10B present the anode stability results in galvanostatic regime of 0.5 A and 1 A, respectively. The numbers above represent the efficiency (η).

As shown in FIG. 10A, in galvanostatic regime of 0.5 A (36 mA·cm⁻²), the efficiency of the Cu electrode increased in the second cycle from 31% to 52% and decreased to 31% in the fifth cycle. As shown in FIG. 10B, in galvanostatic regime of 1 A (71 mA·cm⁻²), the anode efficiency decreased from 43% in the first cycle to 35% in the fifth cycle.

Without being bound by any particular theory, it is suggested that the increased efficiency after the first cycle (see, FIG. 10A) is attributed to an increase in the active surface area of the electrode. It is postulated that the Cu electrode is ionized to a Cu—$NH_3$ complex ion, which undergoes a non-electrochemical rapid reduction by the $BH_3OH^-$ reduction agent, formed upon the potential-induced cleavage of the $NH_3$—$BH_3$ bond. This reduction results in the appearance of $Cu^0$ on the electrode surface, which increases the Cu-electrode roughness factor, namely, significantly increases the active electrode surface. Thus, it is postulated that the increased surface area results in increased voltage (power) of the electrochemical process in the second cycle. A slight decrease of the anode efficiency after several cycles, as shown, for example, in FIG. 10A and in FIGS. 11A-B infra, can be explained by the formation of the reaction products $NH_4^+$ and $BO_2^-$ during the above-mentioned non-electrochemical reduction and a decrease of the pH value (since $OH^-$ ions are consumed during the electro-oxidation reaction of AB.

Such a process suggests that the Cu electrode is subjected to minimized, and even abolished, oxidation during the electrochemical process, and is therefore highly efficient.

Reproducibility

Figure 11A:
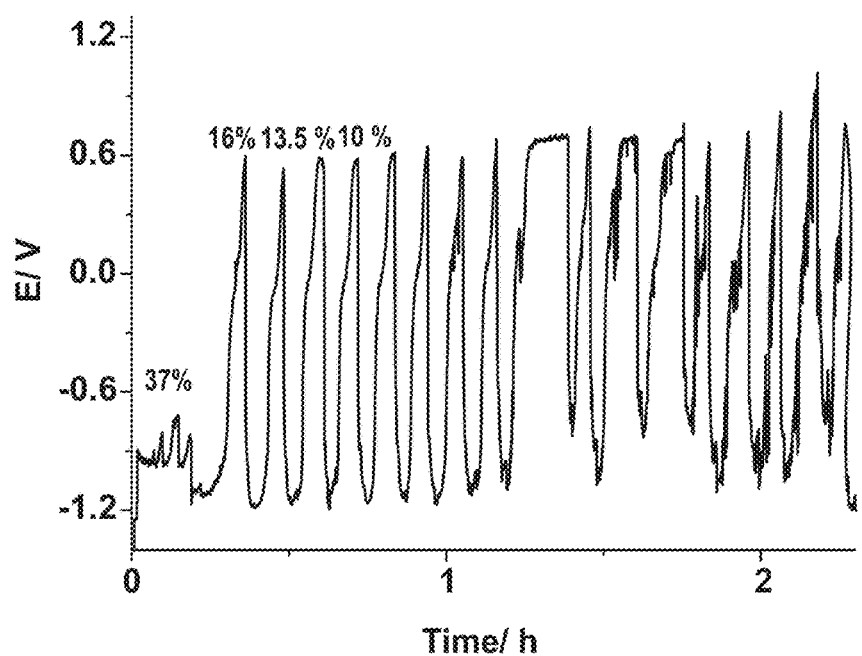
FIGS. 11A-B demonstrate the stability of a Cu-mesh electrode (1 cm$^2$), according to various embodiments of the invention, in current regime of 0.5 A (0.5 A·cm$^{-2}$) (FIG. 11A) and 1 A (1 A·cm$^{-2}$) (FIG. 11B). The numbers above represent the efficiency (ii). Ag/AgCl, KCl saturated, was used as reference electrode.
Figure 11B:
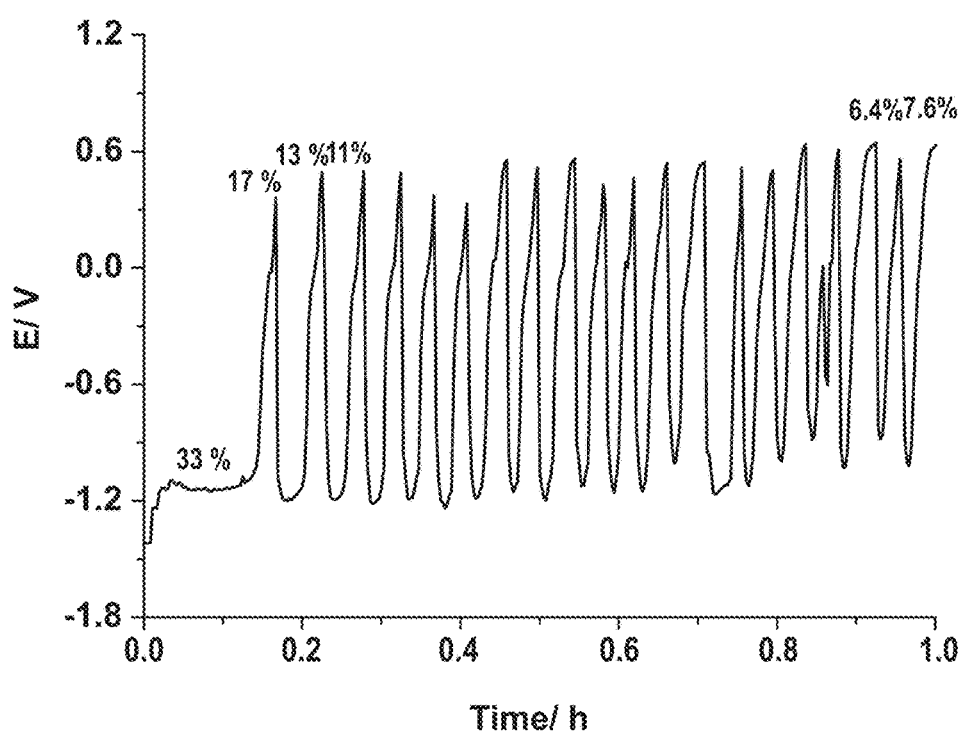

The anode discharge efficiency measurements were also performed at a higher current density, of up to 1 A·$cm^{-2}$ (galvanostatic regime). FIGS. 11A and 11B present the anode discharge efficiency, at 0.5 A·$cm^{-2}$ and 1 A·$cm^{-2}$, respectively, and show that by increasing the total current (or total number of cycles) current density is increased.

FIGS. 11A-B further show that the absolute potential dramatically increased from the first cycle to the subsequent cycles. Since the absolute potential is proportional to an increase in the electrode's active surface, as current density increases when electrode active surface increases, these data further support the proposed mechanism outlined hereinabove for the increase in the active electrode surface during the electro-oxidation process.

The obtained results presented in FIGS. 10A-B and 11A-B further demonstrate that the Cu electrode produces good stability, as after each addition of fresh AB the voltage returns to a similar value.

Example 3

An Ammonia-Borane Based Fuel Cell with an Organic-Coated Carbon Cloth Electrode

The present inventors have further practiced a fuel cell which contains ammonia-borane (AB) as fuel and $H_2O_2$ as oxidant, with a Cu catalyst (mesh or nanoparticles-containing) for electro-oxidation of AB, and a carbon cloth/Ferrocene (C/Fc) or a carbon cloth/Prussian blue (C/PB) catalyst for the electro-reduction of hydrogen peroxide ($H_2O_2$). Such Fuel cells are described as Cu-AB//$H_2O_2$—C/Fc and Cu-AB//$H_2O_2$—C/PB, respectively, and represent a novel AB/$H_2O_2$ fuel cell that is devoid of a noble metal catalyst.

These fuel cells are cost-effective and consist of relatively simple catalysts. As demonstrated hereinafter, these fuel cells have significantly improved performance as compared to $NaBH_4$//$H_2O_2$ and AB//$O_2$ fuel cells, in parameters such as high open circuit potential ($E_{OCP}$) (of about 2 V), high discharge voltage and high current density ($E_W$=1.2 v at I=0.7 A).

The efficiency of the AB/Cu anode in the fuel cells described herein is about 40% (from original amount of AB), depended from discharge current.

The efficiency of each of the $H_2O_2$/PB and $H_2O_2$/Fc cathodes described herein is about 20% (from original amount of $H_2O_2$).

These fuel cells produce a current density of 70 mA/$cm^2$, and a power density of about 84 mW/$cm^2$.

Materials and Experimental Methods

Carbon cloth, B-1/A, was purchased from "E-TEK".

Ferrocene was obtained from Sigma and a saturated ferrocene ethanolic solution was prepared therefrom by dissolving 20 mg ferrocene in 10 ml ethanol.

Electrochemical measurements were performed as described in Example 1 hereinabove.

Preparation of Prussian blue Carbon cloth cathode (C/PB): a 0.45M of $FeCl_3$ solution and a 0.3M of $K_4$[Fe(CN)$_6$] solution were prepared, and 3 ml of each solution were mixed together to obtain the insoluble Prussian blue [www.chemlab.truman.edu/Chemistryofartlabs/ Synthesis%20of%20Prussian%20Blue.pdf.

A carbon cloth electrode (10 $cm^2$) was washed by ethanol (hydrophilized) and soaked in the Prussian blue solution for 3 hours. The electrode was thereafter washed with water until the water became almost lucid, and was then dried during 3 hours at 100° C. The obtained C/PB electrode was soaked in ethanol (hydrofofizided) before being used.

Preparation of Ferrocene Carbon cloth cathode (C/Fc): Carbon cloth (20 $cm^2$) was pre-treated so as to reduce oxygen species by performing 40 cyclic voltammograms in 1M $H_2SO_4$+10% ethanol, applying a potential from –1.0 V to +1 V (–1 V was applied for 50 seconds and the +1.0 V was applied for 5 seconds before each cycle), scan rate; 50 mV/s.

The treated carbon cloth (20 $cm^2$) was soaked in a saturated ferrocene ethanolic solution and additional 10 ml ethanol for 30 minutes. The obtained C/Fc was dried in an oven, for 1 hour at 40° C. The C/Fc electrode was soaked in ethanol before being used.

Results

A carbon Prussian blue electrode (C/PB) based on carbon cloth and insoluble Prussian blue was fabricated as described hereinabove, and the electro-reduction of hydrogen peroxide ($H_2O_2$) using the carbon cloth/PB electrode was studied in linear voltammetry (LSV) method and in galvanostatic regime.

The electro-reduction process of $H_2O_2$ using C/PB electrode (10 $cm^2$) was tested. The experiment was preformed in 2.5M $H_2SO_4$ as a background solution containing 1% w/v $H_2O_2$. The electrochemical measurements were performed by applying a sweep potential, scan rate 50 mV·$s^{-1}$, using Ag/AgCl, KCl saturated, as reference electrode.

Figure 12:
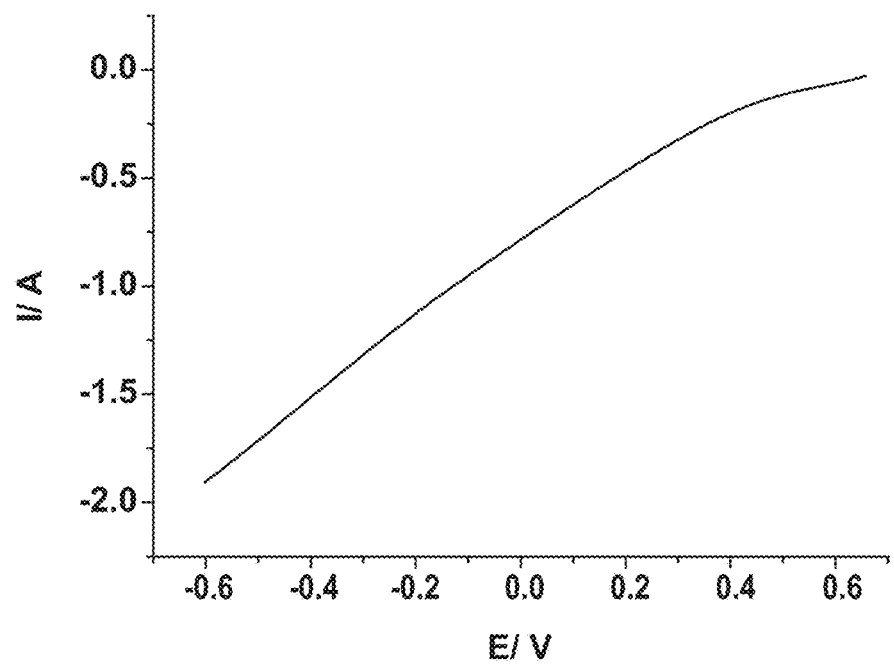
FIG. 12 is a plot presenting the electro-reduction process of $H_2O_2$ using C/PB electrode (10 cm$^2$), preformed in 2.5M, $H_2SO_4$ as a background solution containing 1% w/v $H_2O_2$, according to various embodiments of the invention. The electrochemical measurements were performed by applying a sweep potential, scan rate 50 mv·s$^{-1}$, using Ag/AgCl, KCl saturated, as reference electrode.

FIG. 12 presents a typical voltammetric curve of the electro-reduction of $H_2O_2$ using carbon cloth/PB (C/PB) electrode, and shows that this system produces $E_{OCP}$ of 0.66 V (2.5M, $H_2SO_4$, 1% w/v $H_2O_2$) and a relatively high current of about 2 A, –0.6 V.

The stability of the C/PB electrode (10 $cm^2$) was examined by a galvanostatic regime (0.5 A). When $H_2O_2$ was consumed, fresh $H_2O_2$ was added in-situ. The experiments were preformed in 2.5M, $H_2SO_4$ as a background solution containing 0.5% w/v $H_2O_2$ (10 ml). In the first 5 discharge cycles, 0.5% w/v $H_2O_2$ in 2.5M $H_2SO_4$ was added. From the sixth cycle and on, 1% w/v $H_2O_2$ in 2.5M $H_2SO_4$ was added. Ag/AgCl, KCl saturated was used as reference electrode.

Figure 13:
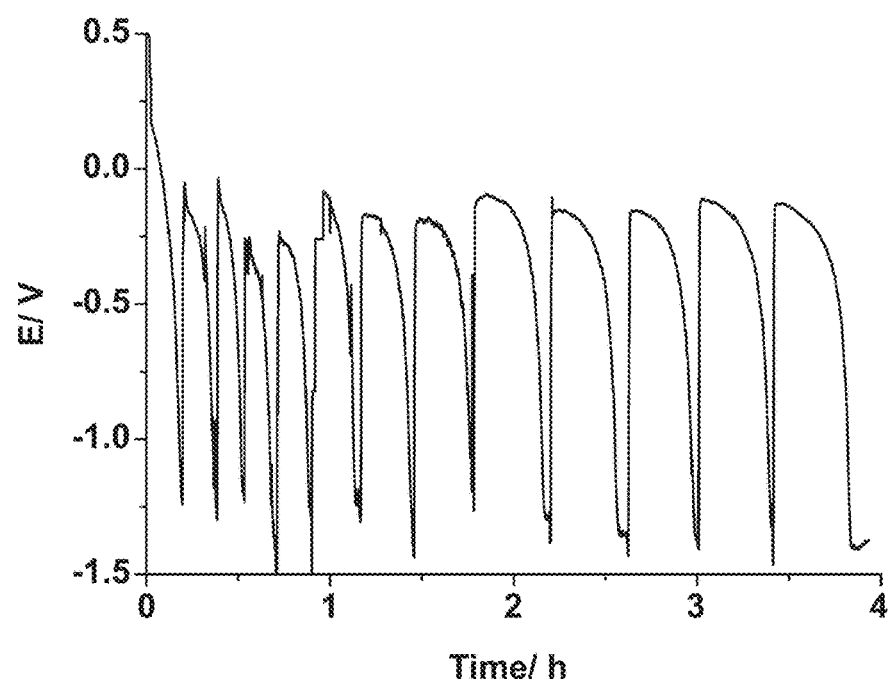
FIG. 13 demonstrates the stability measurement of a C/PB electrode (10 cm$^2$) according to various embodiments of the invention, preformed in galvanostatic regime, 0.5 A, and in 2.5M, $H_2SO_4$ as a background solution containing 0.5% w/v $H_2O_2$ (10 ml).

The results are presented in FIG. 13 and indicate that the half cell containing the C/PB electrode produces a relatively stable voltage (maximum) of about −0.1 V upon each addition of fresh $H_2O_2$.

A carbon ferrocene electrode (C/Fc) was also fabricated, as described hereinabove, and the electro-reduction of hydrogen peroxide ($H_2O_2$) in its presence was studied in linear voltammetry (LSV) method and in galvanostatic regime.

The electro-reduction process of $H_2O_2$ in the presence of C/Fc electrode (10 cm$^2$) in 1.0M $H_2SO_4$ as a background solution containing 1% w/v $H_2O_2$ was tested. The electrochemical measurements were performed by applying a sweep potential, scan rate 50 mv·s$^{-1}$, using Ag/AgCl, KCl sat, as reference electrode.

Figure 14:
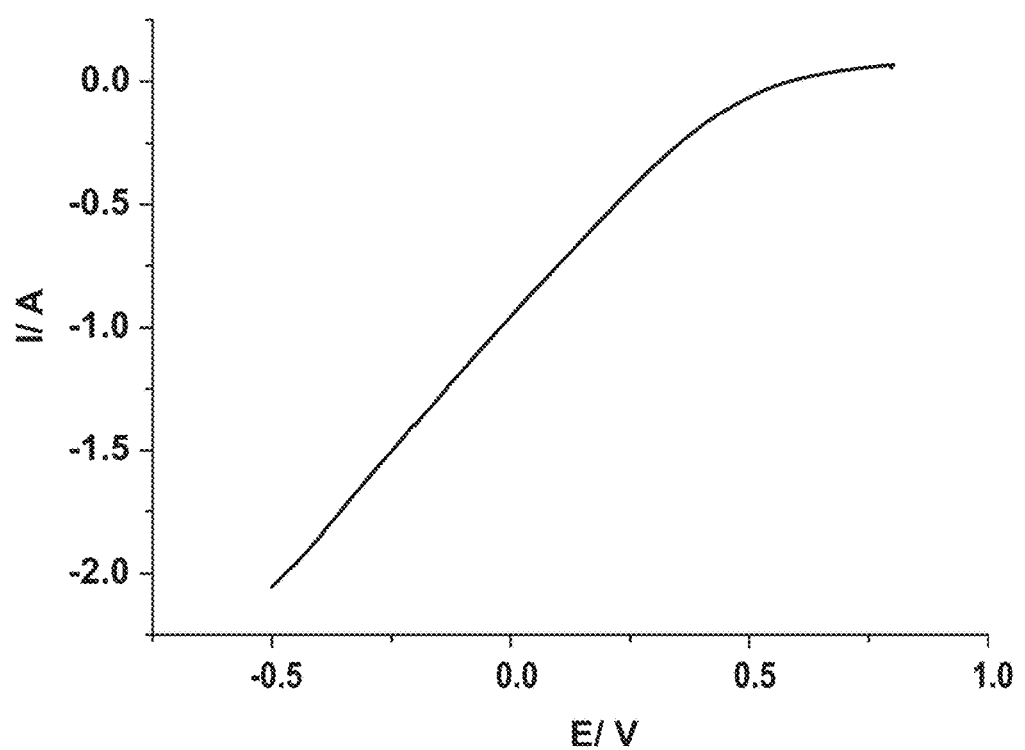
FIG. 14 is s a plot presenting the electro-reduction process of $H_2O_2$ using C/Fc electrode (10 cm$^2$), preformed in 1.0M, $H_2SO_4$ as a background solution containing 1% w/v $H_2O_2$, according to various embodiments of the invention. The electrochemical measurements were performed by applying a sweep potential, scan rate 50 mv·s$^{-1}$, using Ag/AgCl, KCl saturated, as reference electrode.

FIG. 14 presents a typical voltammetric curve of the electro-reduction of $H_2O_2$ using carbon cloth/Fc electrode, and indicates that the electrode produces a high $E_{OCP}$ of 0.72 V and high current value of 1 A at potential of 0 V, with current density that corresponds to 100 mA·cm$^{-2}$.

These results demonstrate that the catalytic effect (electro-reduction of $H_2O_2$) achieved in the presence of the C/Fc electrode described herein is similar to the catalytic effect achieved by Pt (and Pt-group metal) electrodes [see, Ponce de Leona et al. J. Pow. Sour. 2007, 164, 441-448].

Reproducibility measurements of the C/Fc electrode (20 cm$^2$) were preformed in a galvanostatic regime. When the $H_2O_2$ was consumed, new amount of $H_2O_2$ was added in-situ. Ag/AgCl, KCl saturated, was used as reference electrode.

Figure 15A:
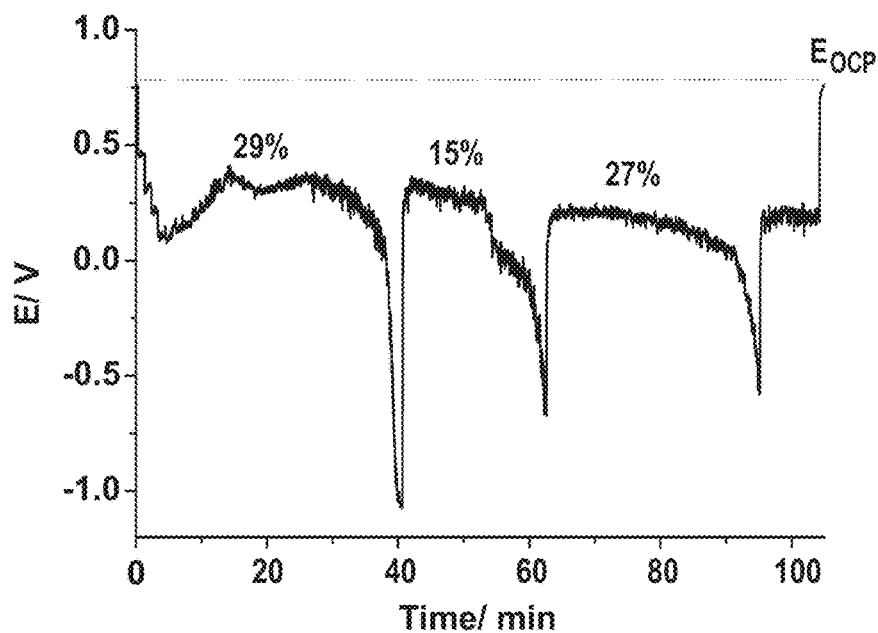
FIGS. 15A-B demonstrate the stability measurements of a C/Fc electrode (10 cm$^2$) according to various embodiments of the invention, preformed in galvanostatic regime, 1 A, and in 1M, $H_2SO_4$ as a background solution containing 5% w/v $H_2O_2$ (20 ml) (FIG. 15A) and in galvanostatic regime, 0.5 A, and 1M $H_2SO_4$+1M HCl as background solution containing 0.5% w/v $H_2O_2$ (10 ml) (FIG. 15B). Ag/AgCl, KCl saturated, was used as reference electrode.

FIG. 15A presents the experiments conducted in a galvanostatic regime of 1 A, and in 1M $H_2SO_4$+1M HCl as a background solution containing 5% w/v $H_2O_2$ (20 ml).

Figure 15B:
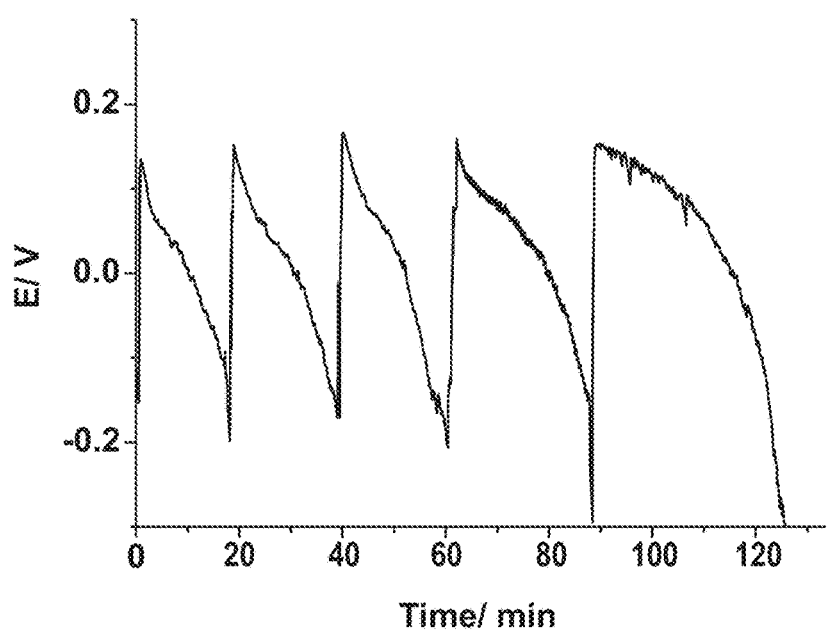

FIG. 15B presents the experiments conducted in a galvanostatic regime of 0.5 A, and in 1M $H_2SO_4$+1M HCl as a background solution containing 0.5% w/v $H_2O_2$ (10 ml). In the first 3 discharge cycles 0.5% w/v $H_2O_2$ in 2.5 $H_2SO_4$ were added From the fourth cycle and on, 1% w/v $H_2O_2$ in 2.5 $H_2SO_4$ were added.

The results presented in FIG. 15A clearly show that the C/Fc electrode is characterized by high stability. The electro-oxidation of $H_2O_2$ occurs in a potential of about 0.2 V upon each addition of fresh $H_2O_2$.

The high value of $E_{OCP}$ (0.77 V) was kept at the end of the measurement, indicating that the C/Fc catalytic activity did not decrease after 3 discharge cycles.

The results presented in FIG. 15B further emphasize the stability of the C/Fc electrode, during 5 discharge cycles.

The obtained data clearly indicate that the low cost C/Fc cathode can act at least as efficiently as Pt electrodes, producing high current density.

In further experiments, the carbon cloth-ferrocene cathode and the Cu mesh electrode were utilized for constructing a fuel cell presented as:

Cu-mesh//0.4M $NH_3$—$BH_3$+3M NaOH||1M $H_2SO_4$+ 0.5M $Na_2SO_4$+3% w/V, $H_2O_2$//carbon felt-ferrocene, both electrodes having a surface area of 14 cm$^2$.

Figure 16:
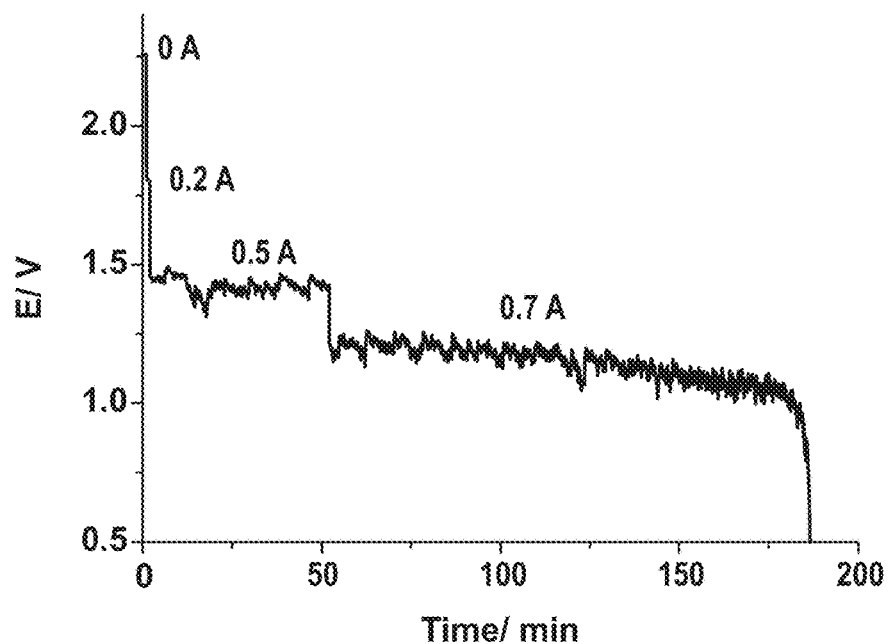
FIG. 16 presents full cell measurements for a fuel cell Cu-mesh//0.4M $NH_3$—$BH_3$+3M NaOH || 1M $H_2SO_4$+0.5M $Na_2SO_4$+3% w/v, $H_2O_2$//carbon felt-ferrocene, having an anode surface area of 10 cm$^2$ and a cathode surface area of 20 cm$^2$, according to various embodiments of the invention. Full cell measurements were preformed in galvanostatic regime applying different successive currents: 0 A for 60 seconds, 0.2 A for 200 seconds, 0.5 A for 3,000 seconds and 0.7 A for 30,000 seconds.

The full cell was tested in galvanostatic regime in different currents up to 0.7 A. As shown in FIG. 16, the fuel cell produces a current density of 70 mA/cm$^2$ and a power density of about 84 mW/cm$^2$.

In additional experiments, fuel cell measurements were performed using different concentrations of the various ingredients.

Figure 17:
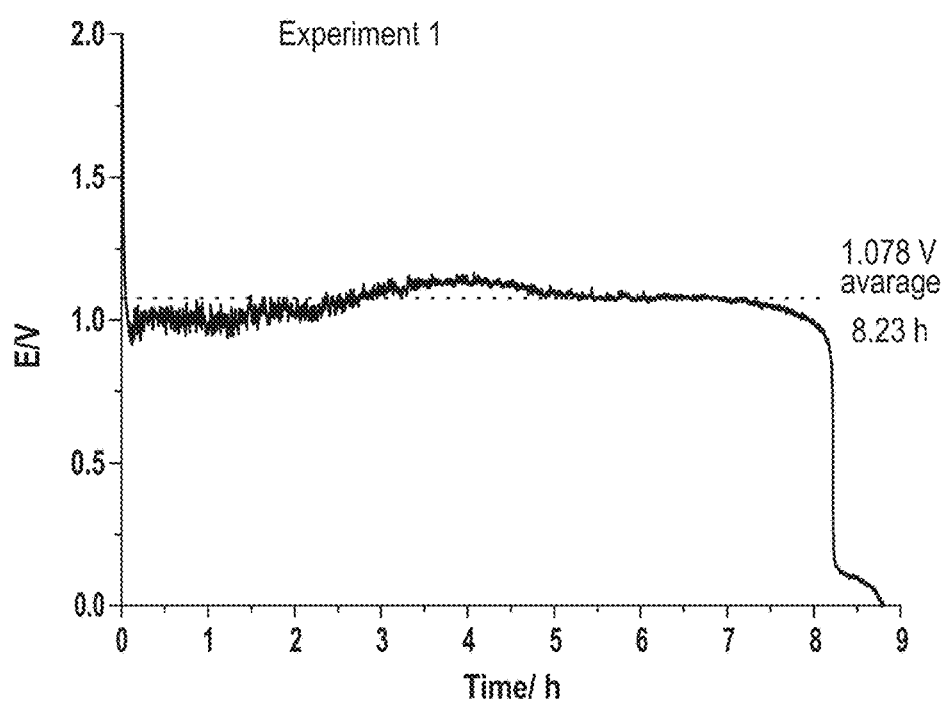
FIG. 17 presents full cell measurements for a fuel cell Cu-mesh//2.7M $NH_3$—$BH_3$+4.4M NaOH || 2M HCl+30% w/v, $H_2O_2$//carbon felt-ferrocene, having an anode surface area of 11 cm$^2$ and a cathode surface area of 50 cm$^2$, according to various embodiments of the invention. Full cell measurements were preformed in galvanostatic regime applying a current of 1 A.

FIG. 17 presents data obtained for the fuel cell presented as:

Cu-mesh//2.7M $NH_3$—$BH_3$+4.4M NaOH||2M HCl+ 30% w/v, $H_2O_2$//carbon felt-ferrocene, having an anode surface area of 11 cm$^2$ and a cathode surface area of 50 cm$^2$, and operated under a galvanostatic regime at 1 A.

This full cell produces an average voltage of about 1.1 Volts, capacity of about 8.2 Ah and energy of about 9 Wh (8.2·1.1), with the energy density corresponding to about 1,500 Wh/Kg (AB).

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A fuel cell system comprising:
    an anode compartment, a cathode compartment, and a separator interposed between said cathode and said anode compartments, wherein an anode of said anode compartment comprises a catalyst layer consisting of a metal selected from the group consisting of copper, gold, silver, and an alloy of at least one of copper, silver and gold, said catalyst layer being devoid of a platinum group metal,
    the fuel cell system being identified as operable by contacting said anode compartment with a fuel composition which comprises a compound having the formula $R_1R_2R_3N$—$BR_4R_5R_6$ as fuel, contacting said cathode compartment with an oxidant, and electrochemically reacting said fuel composition and said oxidant,
    wherein each of $R_1$-$R_6$ is independently selected from the group consisting of hydrogen, alkyl, alkenyl, alkynyl, heteroalicyclic, alkoxy, and amine, provided that at least one of $R_4$, $R_5$ and $R_6$ is hydrogen.

2. The fuel cell system of claim 1, wherein each of $R_1$-$R_6$ is hydrogen.

3. The fuel cell system of claim 1, wherein said anode compartment is at least partially filled with said fuel composition.

4. The fuel cell system of any of claim 1, wherein said cathode compartment comprises said oxidant for electrochemically reacting with said fuel composition.

5. The fuel cell system of claim 1, wherein said oxidant is a peroxide.

6. The fuel cell system of claim 5, wherein said peroxide is hydrogen peroxide.

7. The fuel cell system of claim 1, wherein said oxidant is oxygen.

8. The fuel cell system of claim 1, wherein said anode comprises a catalyst layer consisting of copper or an alloy thereof.

9. The fuel cell system of claim 8, wherein said copper comprises copper nanoparticles.

10. The fuel cell system of claim 8, wherein a cathode of said cathode compartment comprises a catalyst layer that comprises a non-noble metal and/or a non-metallic substance.

11. The fuel cell system of claim 8, wherein a cathode of said cathode compartment comprises a catalyst layer selected from the group consisting of silver, gold, copper, an alloy of at least two of silver, gold and copper and said non-metallic substance.

12. The fuel cell system of claim 5, wherein a cathode of said cathode compartment comprises a catalyst layer that comprises a non-noble metal and/or a non-metallic substance.

13. The fuel cell system of claim 12, wherein said cathode comprises a catalyst layer that comprises said non-metallic substance.

14. The fuel cell system of claim 13, wherein said non-metallic substance is selected from the group consisting of a metal complex and an organic substance.

15. The fuel cell system of claim 14, wherein said metal complex is selected from the group consisting of ferrocene and Prussian Blue.

16. The fuel cell system of claim 12, wherein said anode comprises a catalyst layer consisting of a metal selected from the group consisting of copper, gold, silver, and an alloy that comprises at least two of silver, gold and copper.

17. The fuel cell system of claim 12, wherein said anode comprises a catalyst layer consisting of copper or a copper alloy.

18. The fuel cell system of claim 8, wherein a cathode of said cathode compartment comprises a catalyst layer that comprises a metal complex.

19. The fuel cell system of claim 18, wherein said oxidant is a peroxide.

20. The fuel cell system of claim 8, wherein said oxidant is oxygen.

21. The fuel cell system of claim 1, wherein said fuel composition further comprises an alkaline aqueous solution.

22. The fuel cell system of claim 5, wherein said cathode compartment further comprises an acidic aqueous solution.

23. The fuel cell system of claim 1, wherein said separator comprises a solid electrolyte membrane.

24. The fuel cell system of claim 5, exhibiting an open circuit potential ($E_{OCP}$) higher than 2 volts.

25. The fuel cell system of claim 5, exhibiting a power output (W) that equals to or in greater than 1 Watt.

26. A power plant comprising the fuel cell system of claim 1.

27. A vehicle, fueled by the fuel cell system of claim 3.

28. A portable power source, comprising the fuel cell system of claim 1.

29. A method of powering an electricity-consuming device, the method comprising powering the electricity-consuming device with the fuel cell system of claim 3.

30. An electricity-consuming system or device, having incorporated therein the fuel cell system of claim 1.

31. A fuel cell system comprising:
an anode compartment, a cathode compartment, and a separator interposed between said cathode and said anode compartments, an anode of said anode compartment comprising a catalyst layer deposited onto a surface thereof, said catalyst layer being selected from the group consisting of copper and an alloy of copper, said catalyst layer being devoid of a platinum group metal,
the fuel cell system being identified as operable by contacting said anode compartment with a fuel composition which comprises a compound having the formula $R_1R_2R_3N—BR_4R_5R_6$ as fuel, contacting said cathode compartment with an oxidant, and electrochemically reacting said fuel composition and said oxidant,
wherein each of $R_1$-$R_6$ is independently selected from the group consisting of hydrogen, alkyl, alkenyl, alkynyl, heteroalicyclic, alkoxy, and amine, provided that at least one of $R_4$, $R_5$ and $R_6$ is hydrogen.

32. The fuel cell system of claim 31, wherein each of $R_1$-$R_6$ is hydrogen.

33. The fuel cell system of claim 31, wherein said anode compartment is at least partially filled with said fuel composition.

34. The fuel cell system of claim 31, wherein said oxidant is a peroxide.

35. The fuel cell system of claim 31, wherein said oxidant is oxygen.

36. The fuel cell system of claim 31, wherein said copper comprises copper nanoparticles.

37. The fuel cell system of claim 31, wherein a cathode of said cathode compartment comprises a catalyst layer that comprises a metal complex.

* * * * *